(12) United States Patent
Trumper et al.

(10) Patent No.: US 7,772,947 B2
(45) Date of Patent: Aug. 10, 2010

(54) VARIABLE RELUCTANCE FAST POSITIONING SYSTEM AND METHODS

(75) Inventors: David Trumper, Plaistow, NH (US); Daniel J. Kluk, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 448 days.

(21) Appl. No.: 11/737,282

(22) Filed: Apr. 19, 2007

(65) Prior Publication Data

US 2007/0222401 A1    Sep. 27, 2007

Related U.S. Application Data

(63) Continuation-in-part of application No. 10/977,122, filed on Oct. 29, 2004, now Pat. No. 7,616,084.

(60) Provisional application No. 60/517,216, filed on Oct. 31, 2003, provisional application No. 60/619,183, filed on Oct. 15, 2004.

(51) Int. Cl.
*H01F 7/00* (2006.01)
*H01F 7/20* (2006.01)

(52) U.S. Cl. .............. 335/228; 335/285; 269/8

(58) Field of Classification Search ......... 335/220–229, 335/285–289; 269/8
See application file for complete search history.

(56) References Cited

U.S. PATENT DOCUMENTS

| 4,624,169 | A | * | 11/1986 | Nelson | 83/881 |
|---|---|---|---|---|---|
| 4,713,887 | A | * | 12/1987 | Kitamura | 33/1 M |
| 5,388,488 | A | * | 2/1995 | Geidl et al. | 83/56 |
| 6,100,612 | A | * | 8/2000 | Satoh | 310/49.01 |
| 6,424,061 | B1 | * | 7/2002 | Fukuda et al. | 310/49.11 |
| 7,021,603 | B2 | | 4/2006 | Wygnaski | |
| 2005/0056125 | A1 | | 3/2005 | Trumper | |
| 2005/0056800 | A1 | * | 3/2005 | Modien | 123/568.21 |
| 2005/0223858 | A1 | | 10/2005 | Lu et al. | |

* cited by examiner

*Primary Examiner*—Elvin G Enad
*Assistant Examiner*—Bernard Rojas
(74) *Attorney, Agent, or Firm*—Sheehan Phinney Bass + Green PA; Peter A. Nieves

(57) ABSTRACT

A system is provided for positioning an article. In this regard, one embodiment of the system, among others, can be broadly summarized as follows. The system contains a frame and a series of actuators connected to the frame, where the series of actuators contains at least one armature therein. The at least one armature is connected to an article and the series of actuators provides a force on the at least one armature to actuate movement of the at least one armature, thereby causing movement of the article. Each actuator further contains at least one winding set capable of providing a coil flux, at least one permanent magnet capable of providing a permanent magnet flux, and a magnetically conductive core having the permanent magnet therein and at least a portion of the at least one winding set therein. The series of actuators provides the at least one armature and the article with more than one degree of freedom.

21 Claims, 44 Drawing Sheets

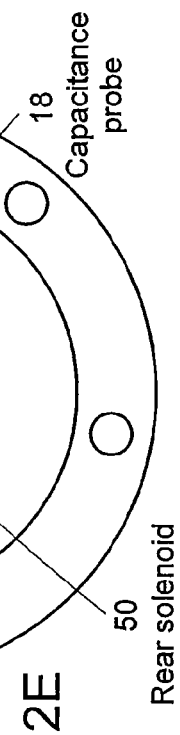
FIG. 2D
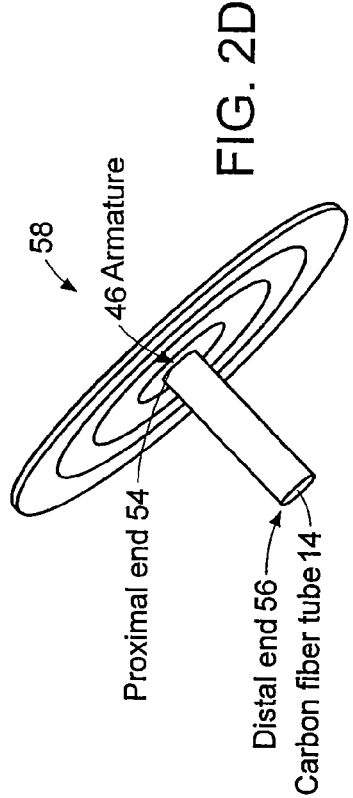
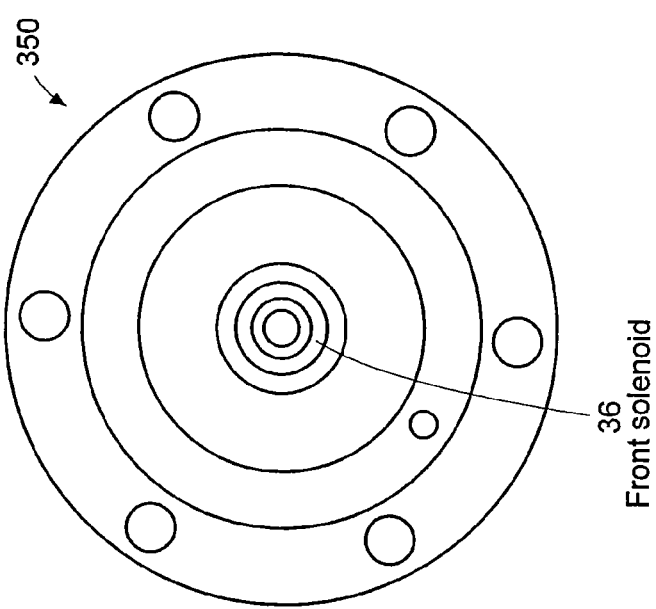
FIG. 2E
FIG. 2C

- - ▶ - - 150 Permanent Magnet Flux
- - - - - ▶ - - - - - 154 Winding Excitation Flux Control Performance for Tracking 5 μm Sine waves

| Frequency (HZ) | RMS Error (nm) / Relative Error | | | |
|---|---|---|---|---|
| | No AFC | 1 AFC | 2 AFCs | 3 AFCs |
| 300 | 194/5.5% | 7.3/0.21% | 2.4/0.07% | 2.2/0.06% |
| 500 | 406/11.5% | 13.6/0.38% | 3.9/0.11% | 2.7/0.07% |
| 700 | 654/18.5% | 17.0/0.5% | 6.2/0.17% | 4.5/0.13% |
| 1000 | 1048/29.6% | 21.4/0.6% | 14.8/0.42% | 7.3/0.2% |

FIG. 16D

The block diagram of the real time computer

The block diagram of the power amplifier

Power amplifier control circuit with flux feedback...

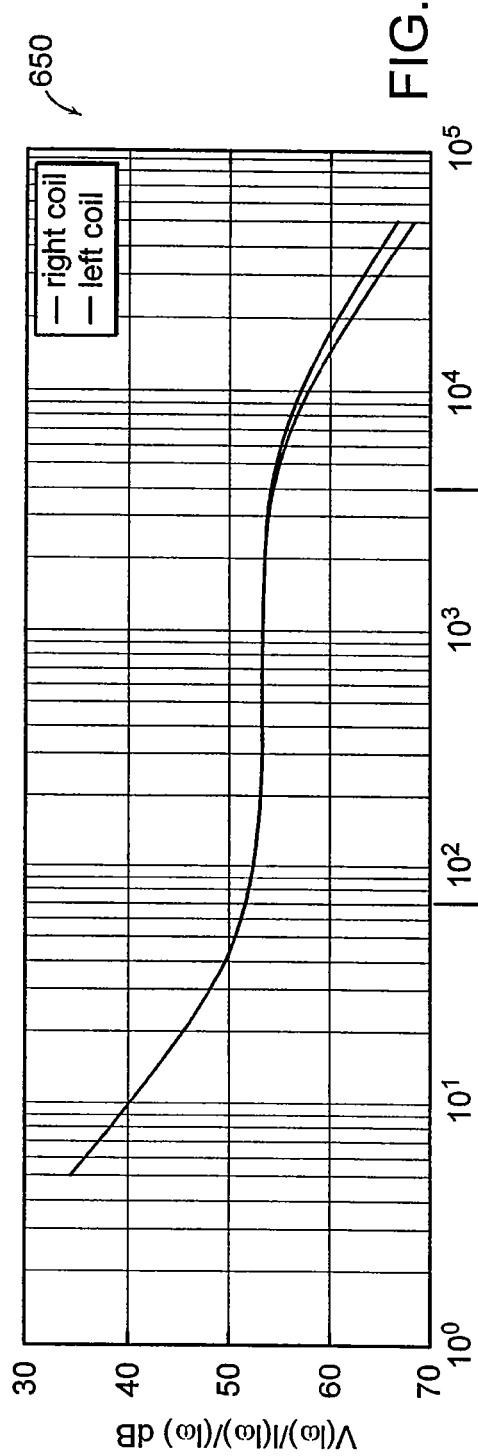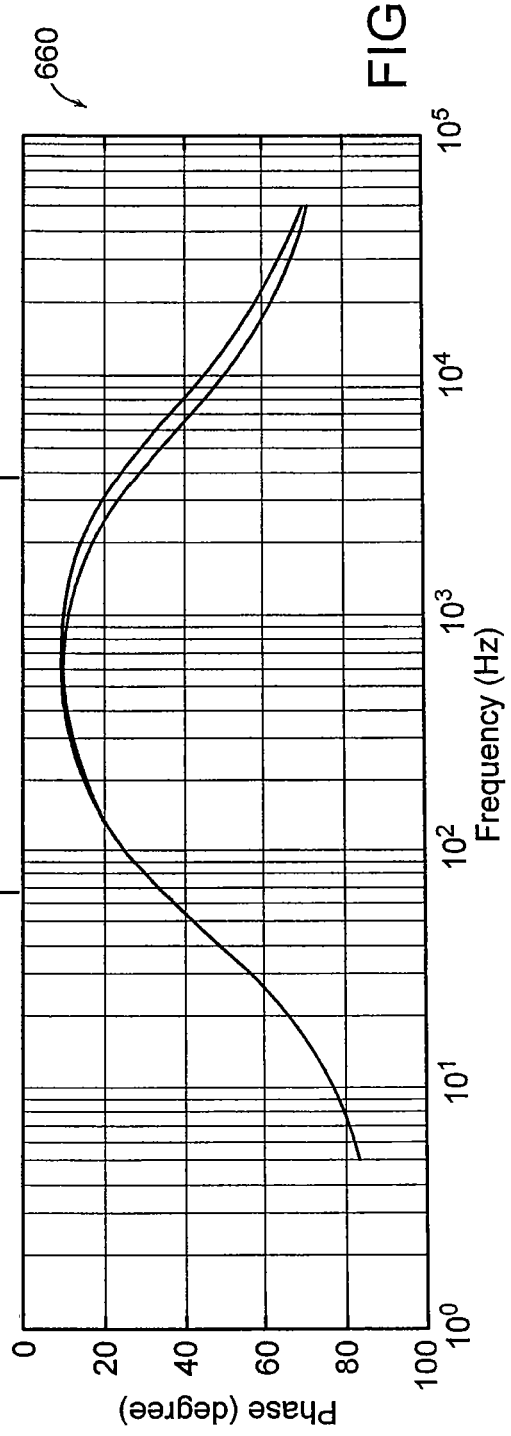
FIG. 19B
FIG. 19C

General class of micro-positioner 680

VARIABLE RELUCTANCE FAST POSITIONING SYSTEM AND METHODS

CROSS REFERENCE TO RELATED APPLICATIONS

This patent application is a continuation-in-part, and claims the benefit of, pending U.S. patent application Ser. No. 10/977,122, having a filing date of Oct. 29, 2004, which claims the benefit of U.S. Provisional Patent Application 60/517,216, having a filing date of Oct. 31, 2003 and U.S. Provisional Patent Application 60/619,183, having a filing date of Oct. 15, 2004, these applications being incorporated herein by reference in their entirety.

BACKGROUND OF THE INVENTION

Fast Tool Servo (FTS) technology can enable precise positioning or manufacturing of complicated sculptured surfaces having nanometer-scale resolution requirements. Such surfaces are used in a wide range of products, including films for brightness enhancement and controlled reflectivity, sine wave ring mirrors used in carbon dioxide ($CO_2$) laser resonators, molds for contact lenses, as well as in micro-optical devices such as Fresnel lenses, multi-focal lenses and microlens arrays. The limits on stroke, bandwidth, acceleration, and position noise of the FTS impose limits on the types, quality, and rate at which the intended surfaces can be produced. The requirements for obtaining high throughput for an FTS include high bandwidth, high acceleration, and high accuracy.

FTS actuators can be categorized as four types: piezoelectric actuators, magnetostrictive actuators, Lorentz force motors (including linear and rotary) and variable reluctance actuators. According to moving strokes, short stroke can be defined as being less than 100 μm, intermediate as being between 100 μm and 1 mm and long stroke as being above 1 mm.

Most of the high bandwidth, short stroke FTS's are based on piezoelectric actuators. Piezoelectric FTS's have the advantage that they can readily achieve bandwidths on the order of several kHz and high acceleration on the order of hundreds of G's, are capable of nanometer resolution of positioning, and can achieve high stiffness (usually greater than 50 N/μm the typical sizes used).

However, piezoelectrically actuated FTS's also have significant disadvantages. When the piezo materials undergo deformation, heat is generated by hysteresis loss, especially in high bandwidth and high acceleration applications. In addition, it may be difficult to couple the piezoelectric material to a moving payload in such a way as to not introduce parasitic strains in the actuator. Furthermore, piezoelectric FTS's require large and expensive high-voltage, high current amplifiers to drive these devices. Still another shortcoming associated with piezoelectrically activated FTS's is that the structural resonance modes of the PZT stacks limit working frequency ranges, because operation near the internal resonances can cause local tensile failure of PZT ceramics. Piezoelectric actuators can also be used in other high-bandwidth, short-stroke applications such as electric engraving, mirror positioning and scanning and micropositioning, but have the same disadvantages.

However, electromagnetic actuators do not have such problems and thus are a promising alternative. Variable reluctance actuators in FTS's have not been developed extensively, because of the difficulty of controlling these devices in the presence of the inherent non-linearities. There still remains a need for developing an electromagnetically driven actuator as a replacement for widely used piezoelectrically actuated systems.

Fast steering mirrors have been in industrial and scientific use for many years. Generally, such fast steering mirrors employ piezoelectric or electromagnetic (Lorentz force) actuation. This actuation technology and structural complexity has a limit in bandwidth.

Therefore, it is desirable to have a fast steering mirror that has increased bandwidth, in addition to other features.

SUMMARY OF THE INVENTION

The present systems and methods provide a device for positioning an article. In this regard, one embodiment of the system, among others, can be broadly summarized as follows. The system contains a frame and a series of actuators connected to the frame, where the series of actuators contains at least one armature therein. The at least one armature is connected to an article and the series of actuators provides a force on the at least one armature to actuate movement of the at least one armature, thereby causing movement of the article. Each actuator further contains at least one winding set capable of providing a coil flux, at least one permanent magnet capable of providing a permanent magnet flux, and a magnetically conductive core having the permanent magnet therein and at least a portion of the at least one winding set therein. The series of actuators provides the at least one armature and the article with more than one degree of freedom.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 2A-2E illustrate various views of an embodiment of a fast tool servo in accordance with an aspect of the invention;

FIG. 16D illustrates tabulated results illustrating the performance of an adaptive feed forward control algorithm;

FIGS. 19B and 19C illustrate the dynamic performance of the actuator in accordance with a preferred embodiment of the present invention;

DETAILED DESCRIPTION OF THE INVENTION

Figure 1:
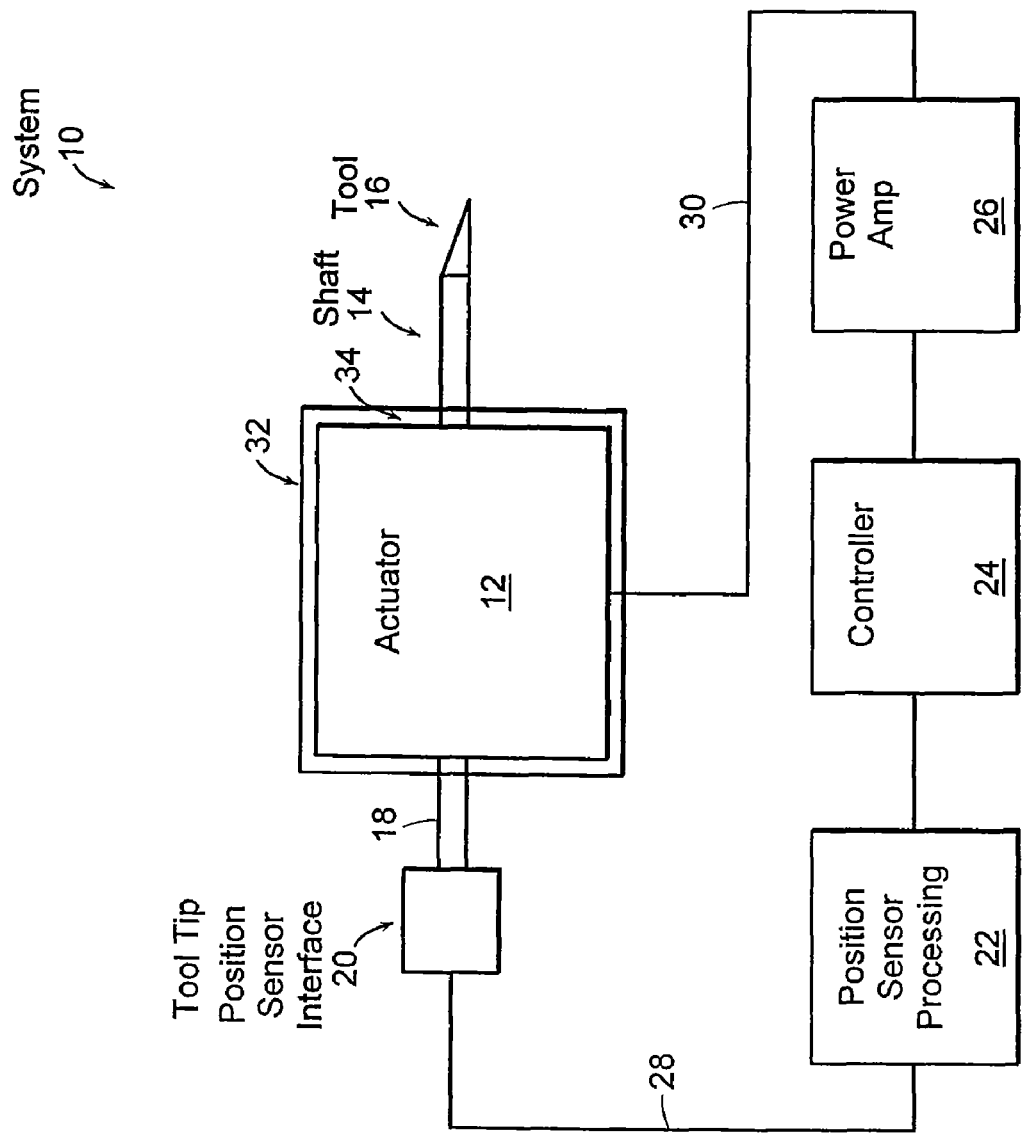
FIG. 1 illustrates a schematic representation of a fast tool servo based system in accordance with embodiments of the invention.

FIG. 1 illustrates a schematic representation of a system 10 containing a linear fast tool servo (linear FTS) 12, also referred to herein as an actuator, having a shaft 14 and tool 16, a tool tip position sensor 18 having a position sensor interface 20 and a position sensor control and processing module 22, a controller 24, and a power amplifier 26. FTS 12 is an electromagnetic device that operates at very high speeds while allowing extremely precise control of tool tip 16. In fact, embodiments of FTS can operate at speeds on the order of 20 kHz while providing tool position accuracies on the order of 1 nanometer (nm).

Position sensor 18 is communicatively coupled to shaft 14 in a manner allowing the position of tool 16 to be monitored with respect to a reference. The reference may be a face 34 of a housing 32 surrounding components making up FTS 12, or the reference may be a gap between magnetic components, a point located external to housing 32, etc. Position sensor 18 may also include an interface 20 and control module 22 for coupling sensor 18 to controller 24.

Interface 20 may be coupled to position sensor processing module 22 using a cable 28. Cable 28 may contain a single electrical or electromagnetic medium such as a wire or optical fiber, or it may contain multiple wires and/or fibers. Cable 28 may carry power, data and/or control signals.

Processing module 22 is coupled to controller 24. Controller 24 may contain a general purpose and/or application specific processor executing machine-readable instructions for controlling the operation of FTS 12. A power amplifier 26 is used to drive shaft 14 at a desired frequency and with a desired excursion or amplitude. Power amplifier 26 may be coupled to FTS 12 using one or more wires 30.

Figure 2A:
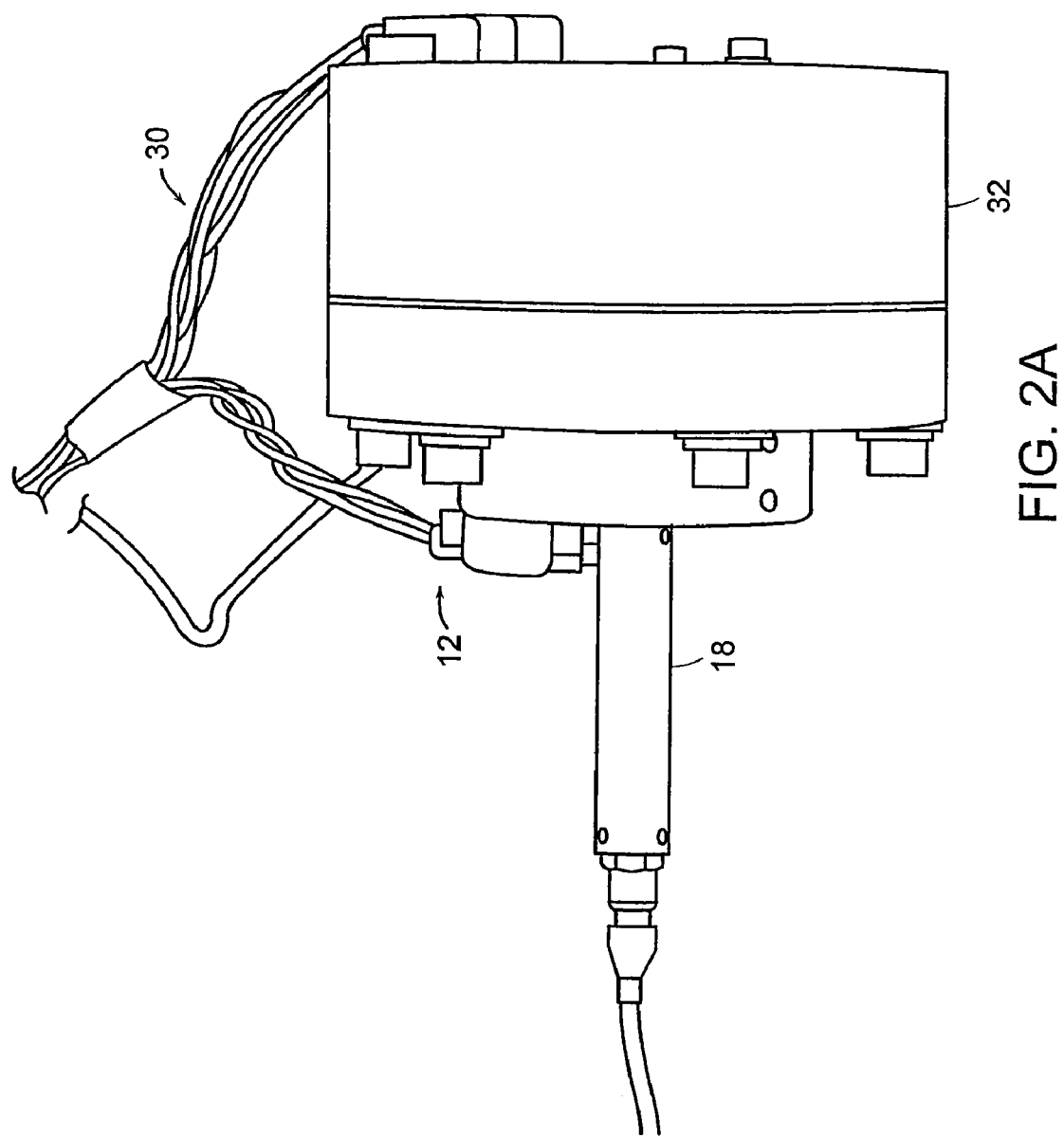
Figure 2B:
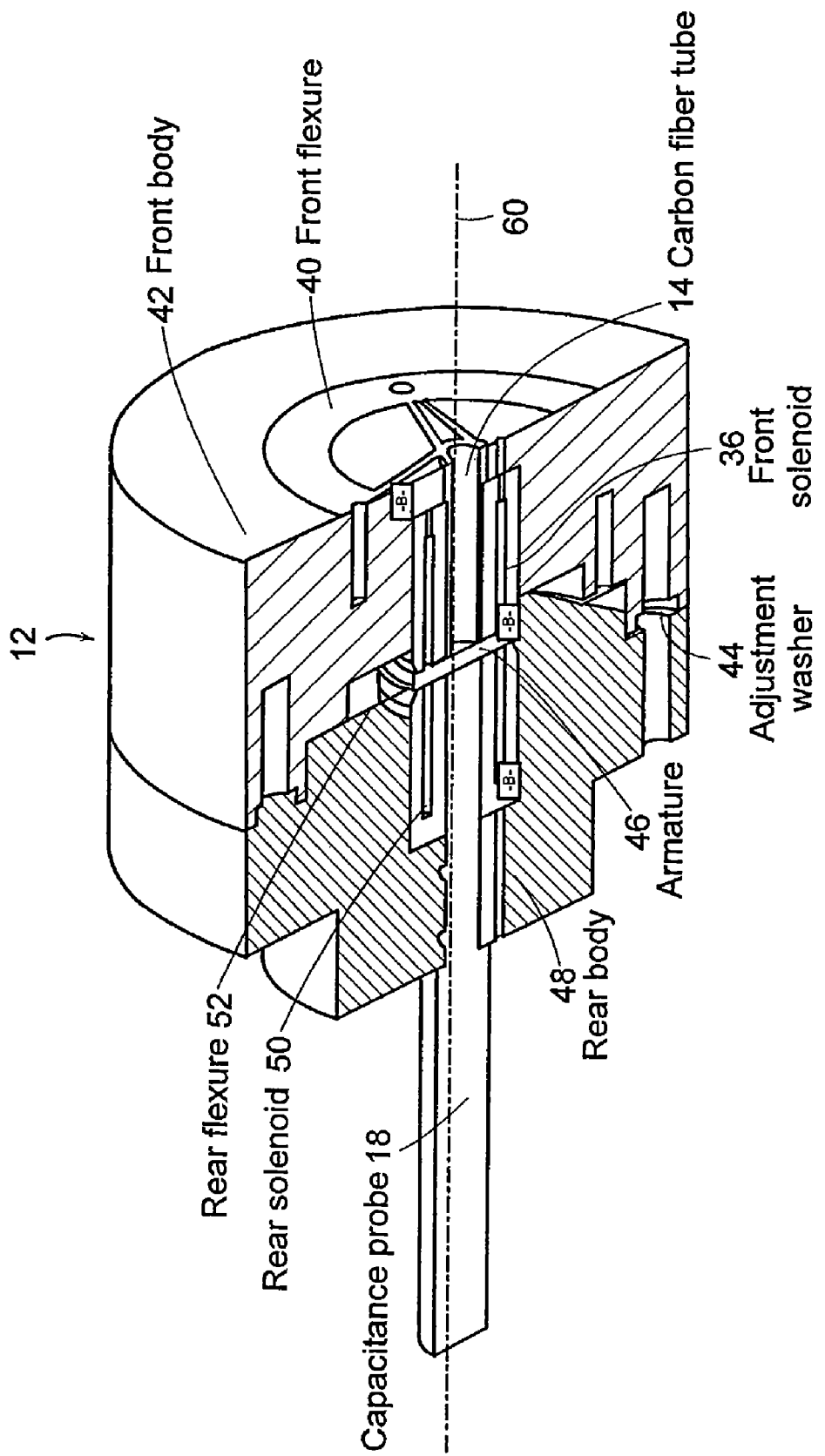

FIG. 2A illustrates an embodiment of FTS 12 showing probe 18, cables 30 and housing 32. FIG. 2B illustrates a cutaway view of the FTS 12 illustrated in FIG. 2A. FIG. 2B illustrates FTS 12 along with a front solenoid 36 (FIG. 2C), shaft 14 (here carbon fiber tube), a front flexure, or bearing 40, a front body 42, an adjustment washer 44, an armature 46, a rear body 48, a rear solenoid 50, a rear flexure 52 and position sensor 18 (here shown as a capacitance probe). Front solenoid 36 and rear solenoid 50 (FIG. 2E) provide a pushing force, displacing (extending) tool 16 away from front face 34, and a pulling force, displacing (retracting) tool 16 toward face 34. Front and rear solenoids 36, 50 apply force to armature 46, which is attached to shaft 14. FIG. 2D illustrates an embodiment of armature 46 and carbon fiber tube 14. As shown in FIG. 2D, a distal end of carbon fiber tube 14 is coupled to armature 46 and a proximal end 56 is available for mounting to a base of tool 16. Armature 46 and carbon fiber tube 14 together make a moving assembly 58, which is suspended to housing 32 using front flexure 40 and rear flexure 52. Flexures 40, 52 may be fabricated from nonmagnetic or magnetic materials such as spring steel.

Flexures 40, 52 guide assembly 58 allowing it to move in only one direction, for example, along axis 60 (FIG. 2B). Thus flexures 40, 52 allow tool 16 to have one degree of freedom. Front solenoid 36 and rear solenoid 50 together provide a push-pull drive to assembly 58. In a preferred embodiment, circular E-type solenoids are employed having respective air gaps on the order of 100 micrometers (μm). If desired, air gaps can be reduced to improve efficiency of operation. FIG. 2C illustrates an embodiment of front solenoid 36 and FIG. 2E illustrates an embodiment of rear solenoid 50.

Figure 3:
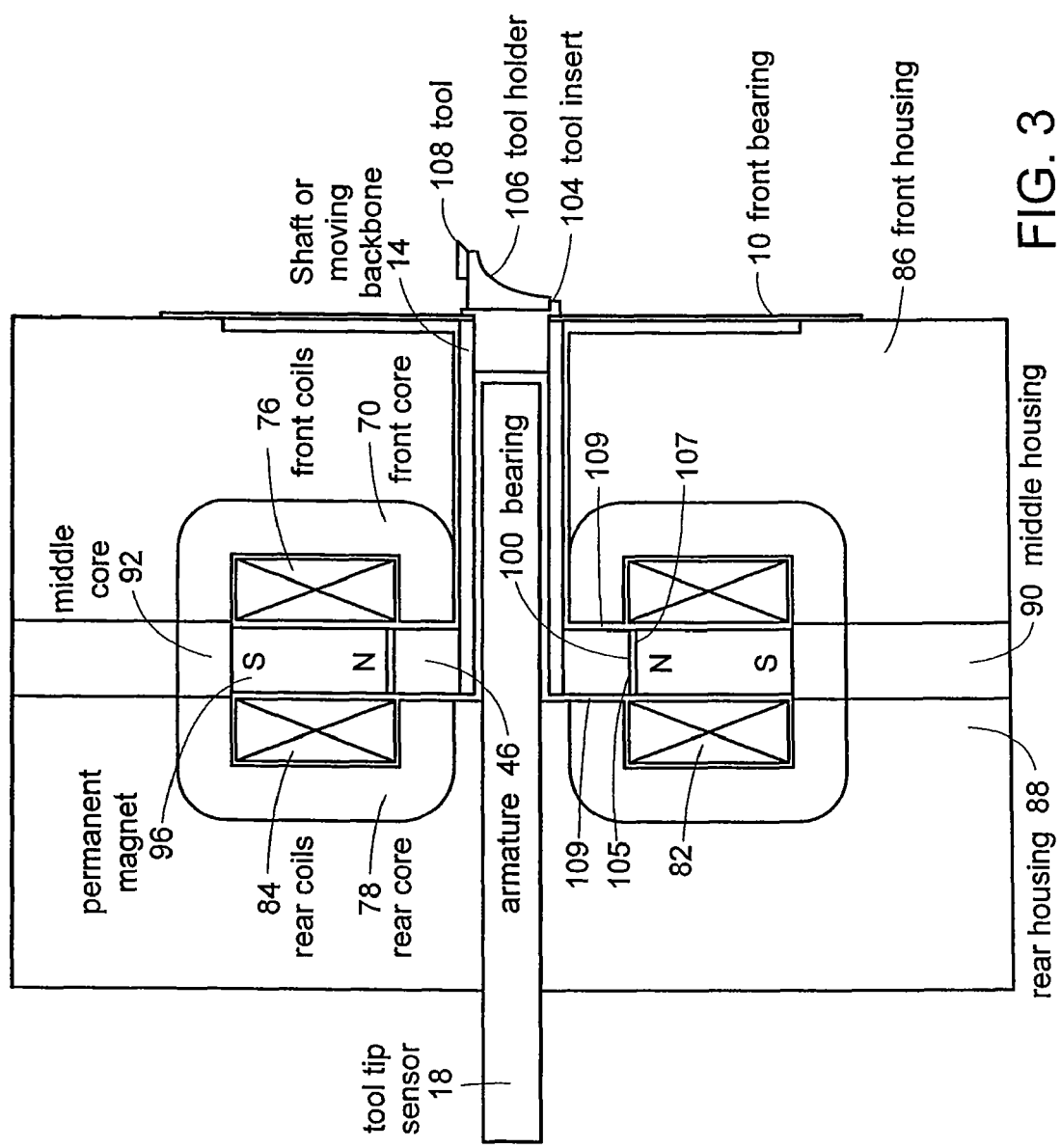
FIG. 3 illustrates a sectional view of a fast tool servo.

FIG. 3 illustrates an embodiment of front solenoid as having a first front core 70 and a front winding set 76. In addition, rear solenoid includes a rear core 78, and a rear winding set 84. Front and rear solenoids may be mounted in a front housing 86 and rear housing 88, respectively. In addition, a middle housing 90 may include a middle core 92, a permanent magnet 96, and a middle bearing 100. Armature 46 may be slideably associated with the middle bearing 100.

Permanent magnet 96 generates a DC biasing flux, which facilitates generation of a force that is linear with respect to both the air gap and excitation current. This linearity results, at least in part, from the fact that the permeability of the permanent magnets is near that of air, and therefore the DC bias flux does not change significantly with the armature position.

FIG. 3 also illustrates an alternative embodiment for mounting a cutting tool to FTS 12. In particular, FIG. 3 illustrates a hollow shaft 14 having position sensor 18 passing into an open inner volume of shaft 14. At the distal end of shaft 14, a tool insert 104 is coupled to shaft 14 and to tool holder 106. Tool holder 106 is in turn releasably coupled to tool tip 108. For example, tool tip 108 may be attached to tool holder 106 using threaded fasteners or a machined recess adapted for holding tool tip 108. Bias is directed through the biasing surface 105, which corresponds to the outer radial surface of the armature 46 on which the middle bearing 100 is secured. The biasing surface 105 faces the bias actuator surface 107 of magnet 96. The force applied to the armature 46 by magnetic front and rear cores 70 and 78 is directed through the working surface 109 on the front and rear sides of the armature 46. Preferred embodiments of the invention separate the working surface 109 and the bias receiving surface 105 completely or provide at most a 10-20 percent overlap of these surfaces. In this embodiment, these two surfaces are positioned at an orthogonal angle relative to each other.

In an embodiment, front core 70 and rear core 78 have gaps approximately 2 millimeters (mm) wide and 20 mm deep into which windings, containing 4 strands of #30 AWG self-bonding wire, are wound. The use of multi-strand self-bonding wire reduces the skin-depth effect in the copper conductor at high frequencies. The mass of armature 46 and shaft 14 can be reduced in order to maximize acceleration and minimize the reaction force associated with assembly 58. Eddy currents along magnetic flux paths may be reduced by utilizing sintered soft magnetic materials made from iron particles having a diameter on the order of 100 μm.

Alternative embodiments can employ different magnetic materials suitable for high frequency applications such as, for example, but not limited to, ferrite, laminated nickel iron, silicon iron, powder sintered iron and laminated metallic glass. Desirable magnetic materials have high saturation, high resistivity, high permeability and mechanical strength.

Figure 4:
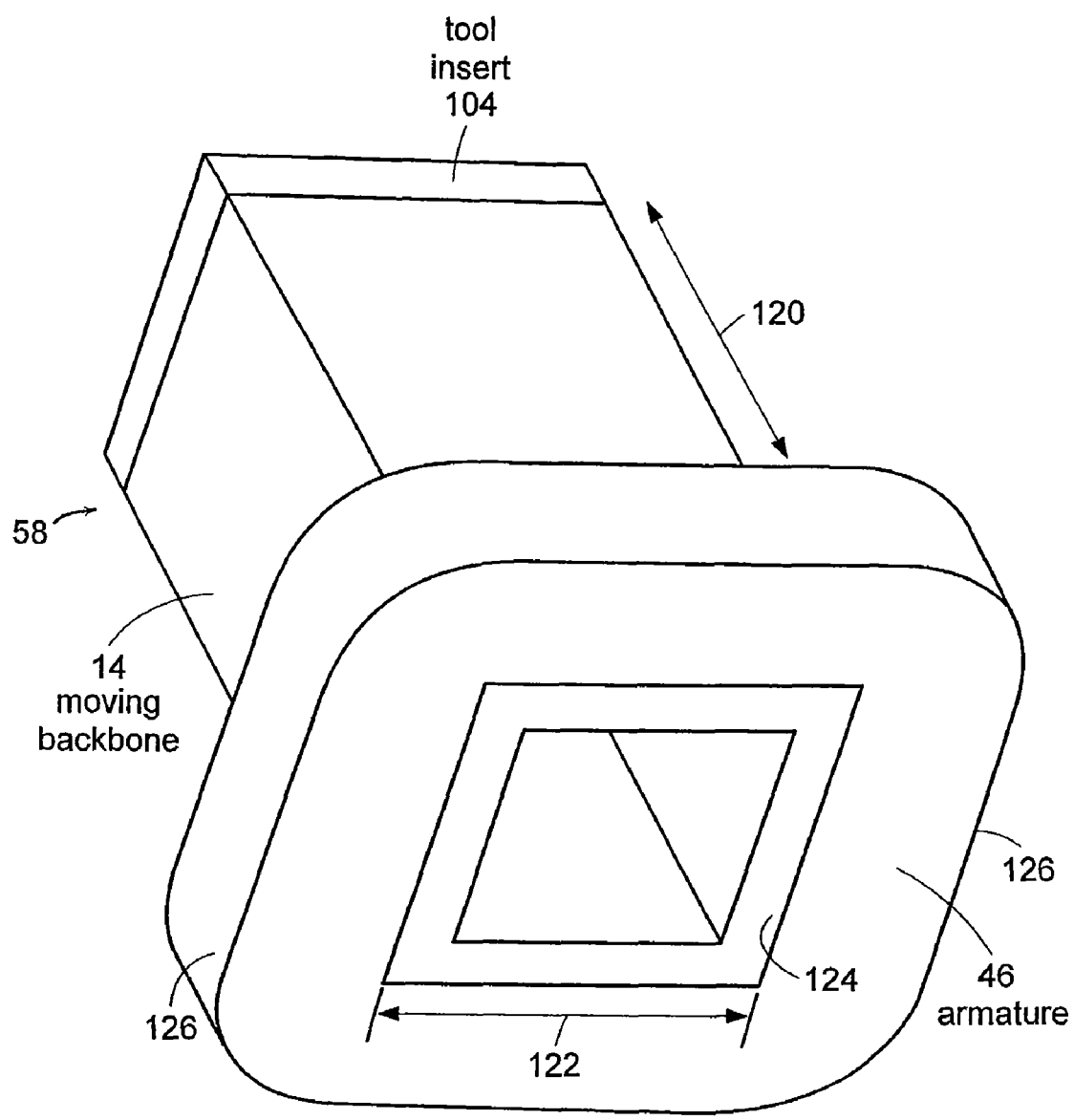
FIG. 4 illustrates an assembly of a fast tool servo including an armature, moving backbone and tool insert.

FIG. 4 illustrates an embodiment of moving assembly 58 coupled to tool insert 104. Shaft 14 is rectangular in shape along its long axis 120 and has a substantially square cross section 122. Shaft 14 is made from a material with high stiffness and low weight such as a metal matrix composite ceramic carbon fiber, aluminum oxide, silicon carbide or silicon nitride. Armature 46 has an inner surface 124 and outer surface 126. Inner surface 124 conforms to the outer dimensions of cross section 122. The sides of armature 46 making up outer surface 126 may take on substantially any shape that facilitates desired operation in conjunction with the magnetic components of front housing 86, middle housing 90 and rear housing 88.

Figure 5:
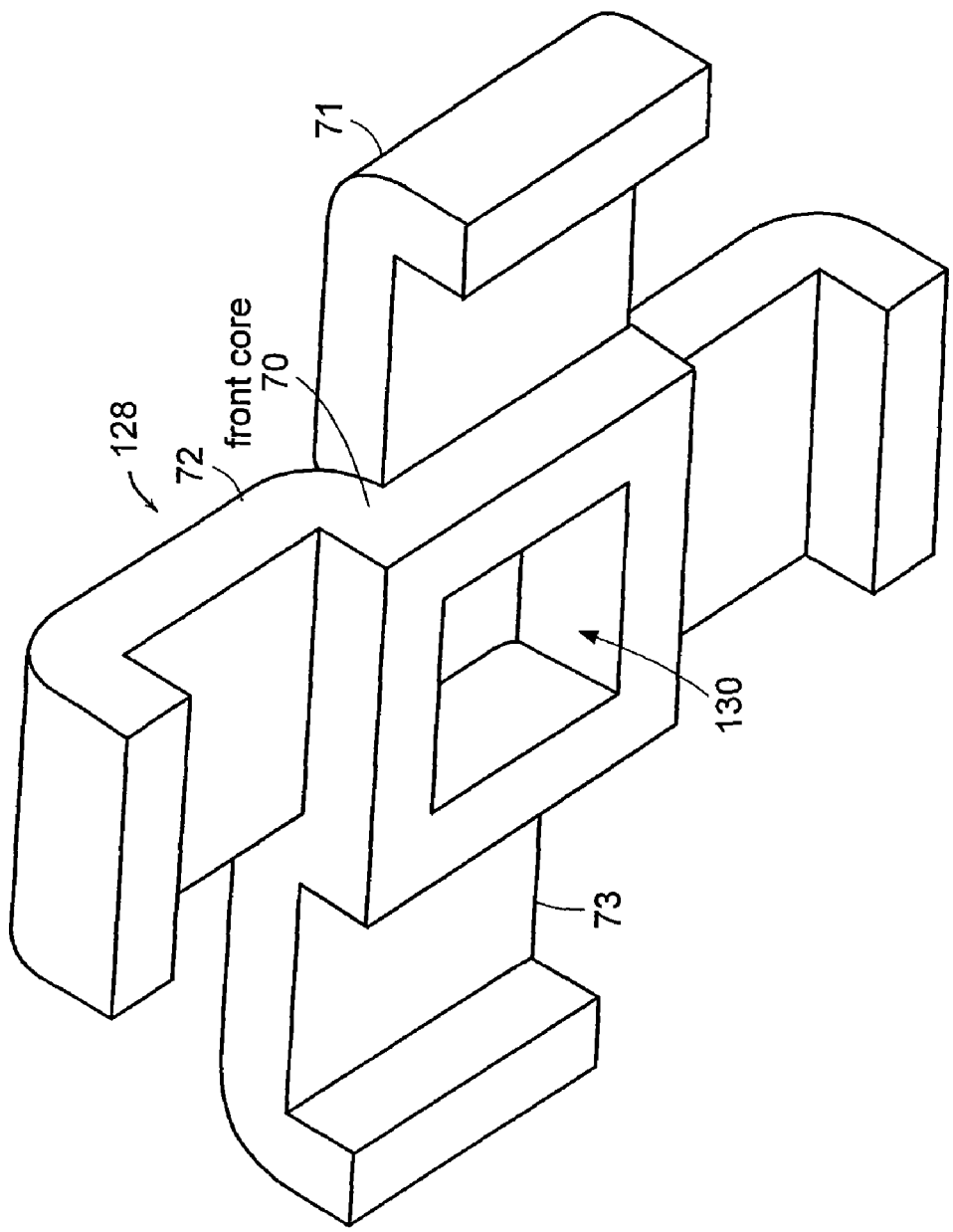
FIG. 5 illustrates an embodiment of a front core for use in a fast tool servo.
Figure 6:
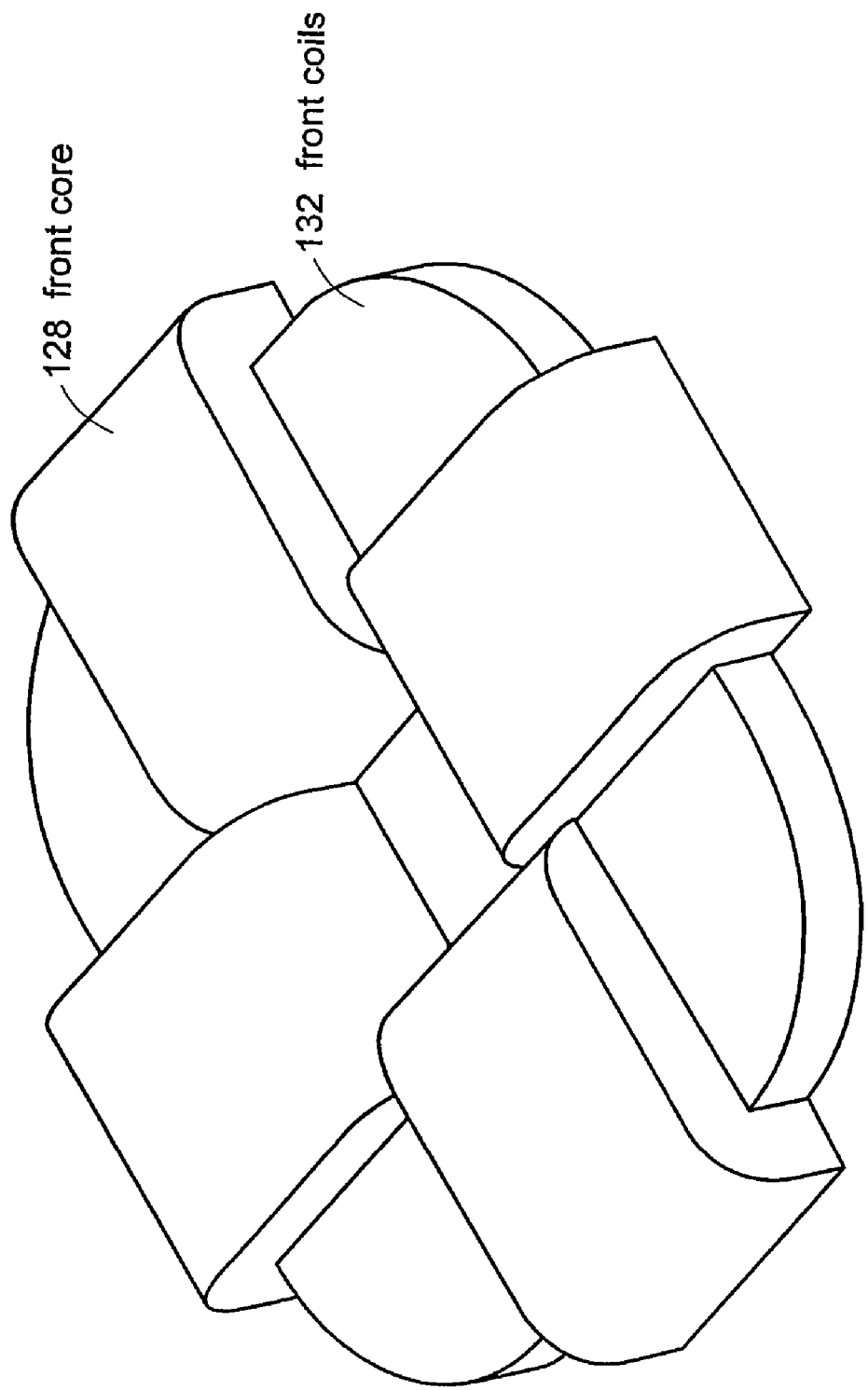
FIG. 6 illustrates the front core of FIG. 5 along with coils for carrying alternating current.

FIG. 5 illustrates a preferred embodiment of front core assembly 128 containing a first front core section 70, second front core section 72, third front core section 71 and fourth front core section 73. Front core assembly 128 has an inner volume 130 shaped to enclose shaft 14 with a determined clearance around each side of shaft 14. FIG. 6 illustrates front core assembly 128 along with a front winding assembly 132.

Figure 7:
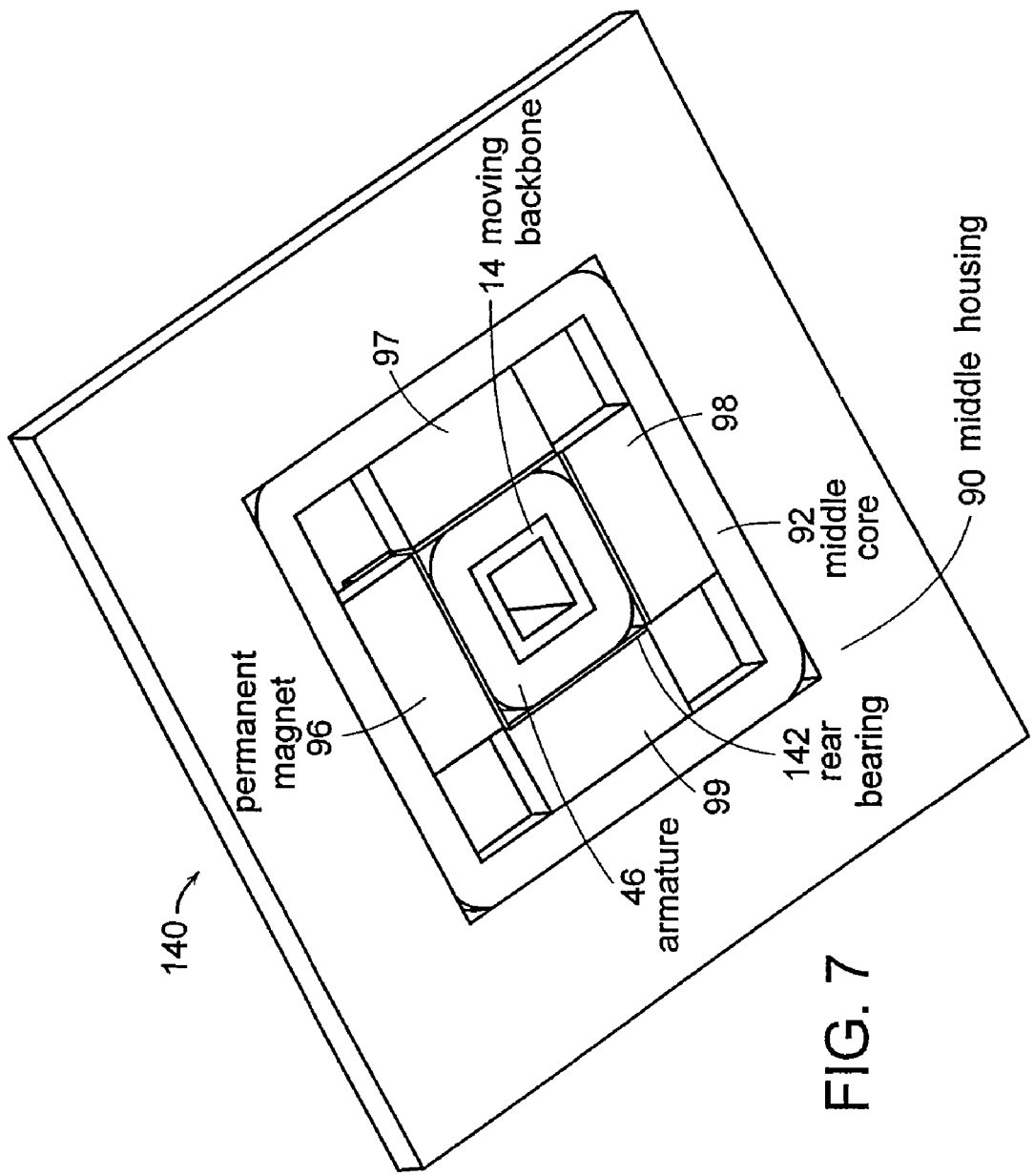
FIG. 7 illustrates a middle assembly of a fast tool servo in accordance with an embodiment of the invention.

FIG. 7 illustrates a middle assembly 140 containing a middle core 92, middle housing 90, a rear bearing 142, and first, second, third and fourth permanent magnets 96, 98, 97, 99, respectively.

Figure 8:
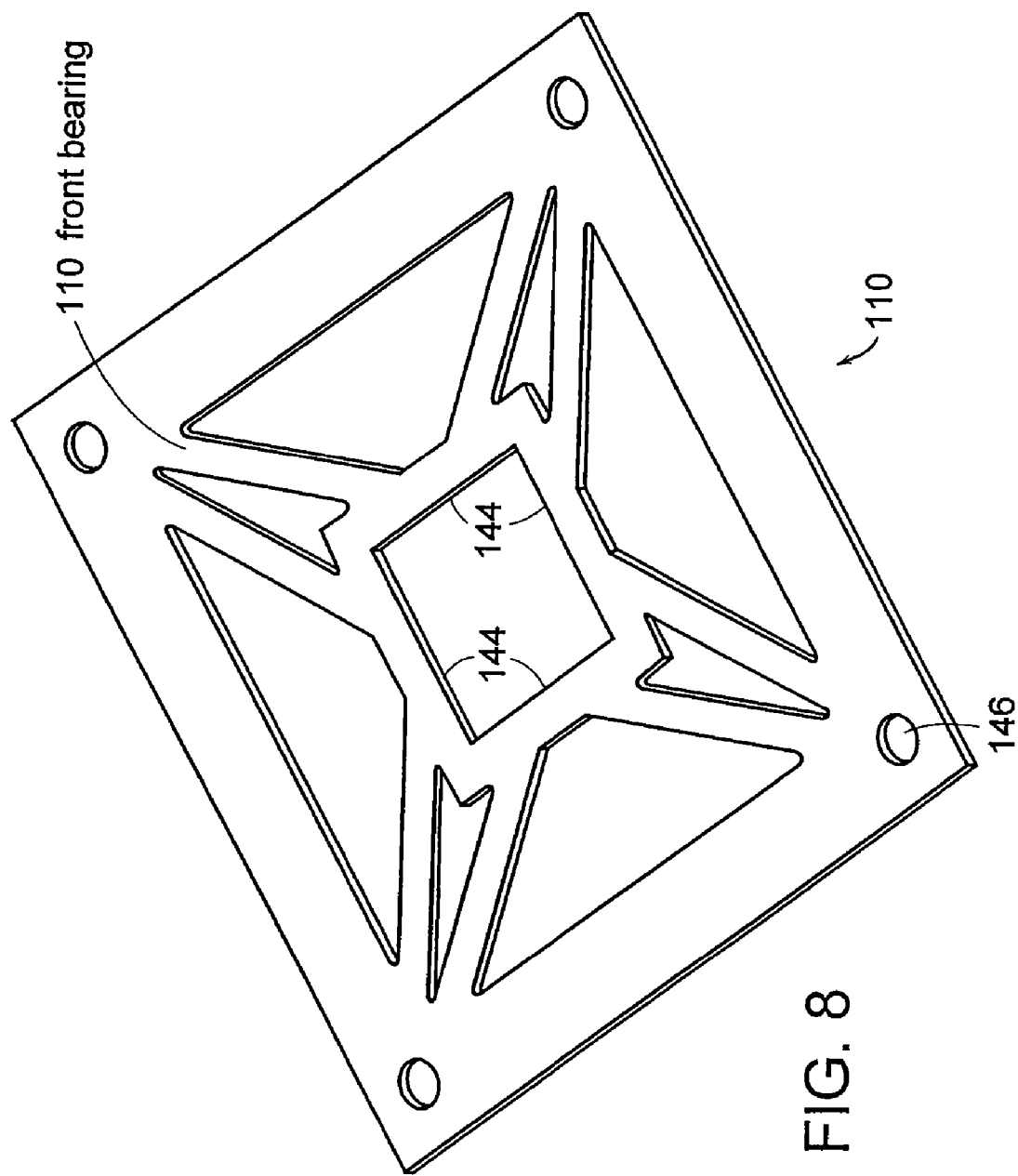
FIG. 8 illustrates an embodiment of a front flexure, or bearing.

FIG. 8 illustrates an embodiment of front flexure, or bearing, 110. Front flexure 110 is substantially planar in shape and cut so as to encircle shaft 14 using inner surfaces 144 while mounted to front housing 86. Front flexure 110 can be fitted with mounting holes 146. Front flexure 110 also provides lateral stiffness and rotational stiffness to the armature and the shaft 14.

Figure 9A:
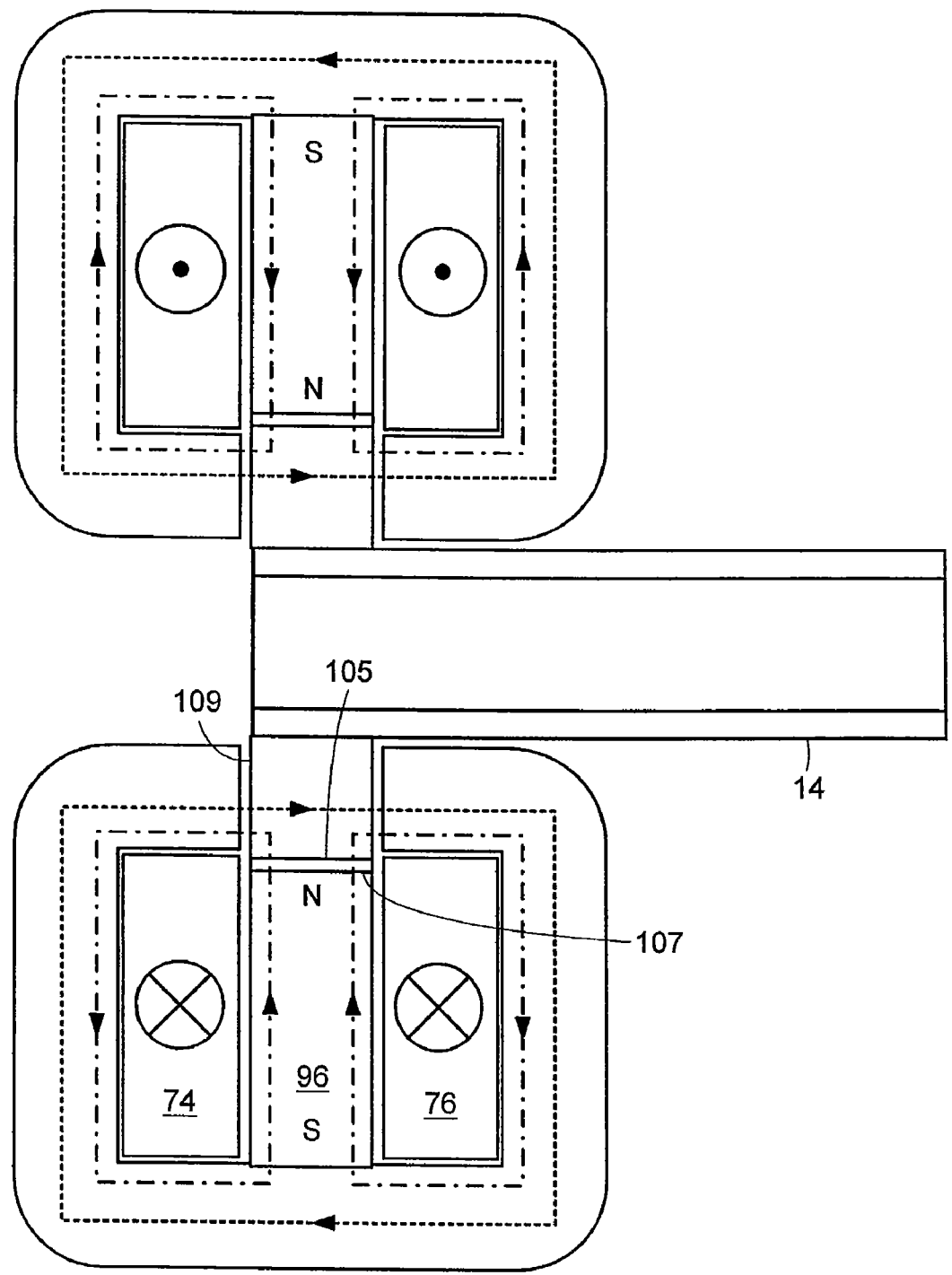
FIG. 9A illustrates various flux paths associated with an embodiment of a fast tool servo.

FIG. 9A illustrates flux paths associated with FTS 12. The direct current (DC), or steady state flux 150 is generated by permanent magnet 96. The arrow tips indicate the direction of magnetic induction fields. If the alternating current (AC), or varying, flux generated by coils 74 and 76 flows as shown, the magnetic induction field generated by the excitation current flows as shown by loop 154. The magnitude of the net force is proportional to the current inside the coil windings. If the current directions through the coils are reversed, the net force will be directed in the opposite direction. As such, bi-directional motion of the tool tip 108 is generated by reversing the current directions through the coils.

An elastic material can be positioned in the gap between the bias receiving surface 105 and the bias actuator surface 107.

The embodiment of FIG. 9A produces an actuating force that is a linear function of both the exciting current and armature displacement. Moving assembly 58 (FIG. 2D) contains an armature 46 and motion backbone (shaft) 14 having high specific stiffness. The configuration of FIG. 9A allows the entire normal area of armature 56 to generate normal force since the flux bias is brought in through the radial faces of the armature 56. Moreover, the excitation coils 74, 76 are fully enclosed by the armature pole faces. Thus, more coil area can be accommodated while significantly reducing leakage flux.

The actuating force F is a linear function of exciting current I and the armature position X, which greatly simplifies the associated control laws. By normalizing these variables with $F_o$, $I_o$, and $X_o$, the force relation can be formulated as: $f=\eta\lambda$, $\lambda=I+\eta\lambda x$ where f, η, λ, I, and x are normalized force, permanent magnet biasing strength, flux, and excitation current as defined below:

$$f=F/F_o, \quad i=I/I_o, \quad q=B_{pm}/B_o, \quad x=X/X_o, \quad F_o=A_eB_{sat}^2/2\mu_o,$$
$$B_o=B_{sat}/2, \quad B_{pm}=B_rA_{pm}/2A_e, \quad I_o=2X_oB_o/\mu_oN$$

Here $X_o$ is the air gap at neutral position, $B_{sat}$ is the saturation flux of the armature, $B_r$ is the remanence flux of the permanent magnet, $A_e$ is the effective armature pole face area, $A_{pm}$ is the pole face area of permanent magnet, and N is the turn number of excitation coil winding. From this result, it is clear that the actuating force f is more directly related to flux λ than to exciting current i. By using a flux feedback method as shown later, we can thus achieve better linearity than using current control alone.

Figure 9B:
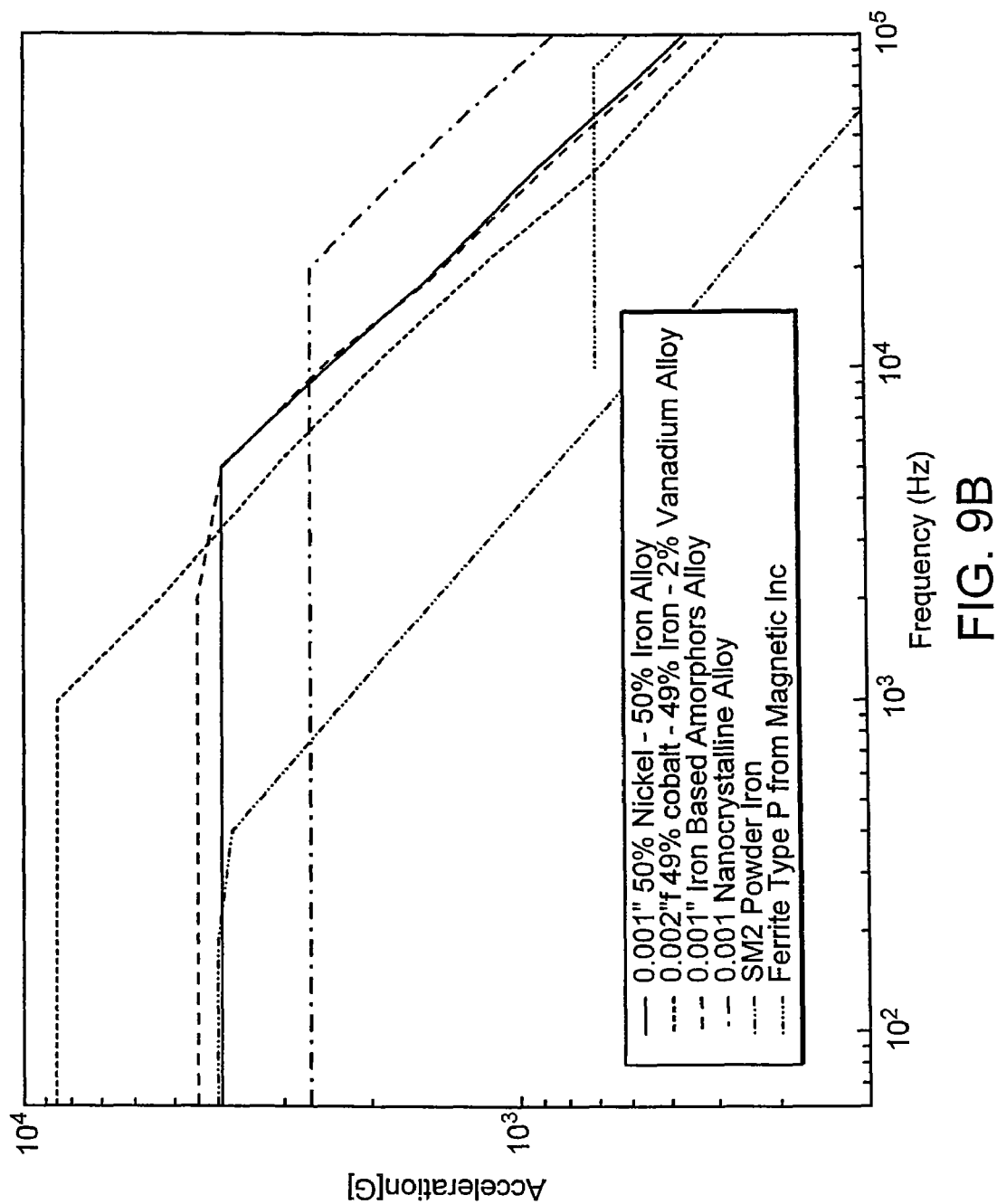
FIG. 9B illustrates various acceleration curves as a function of frequency for magnetic materials used in an embodiment of an armature.

FIG. 9B shows calculated maximum accelerations over frequency for various materials employed in embodiments of armature 46 having a thickness of 3 mm.

Figure 10:
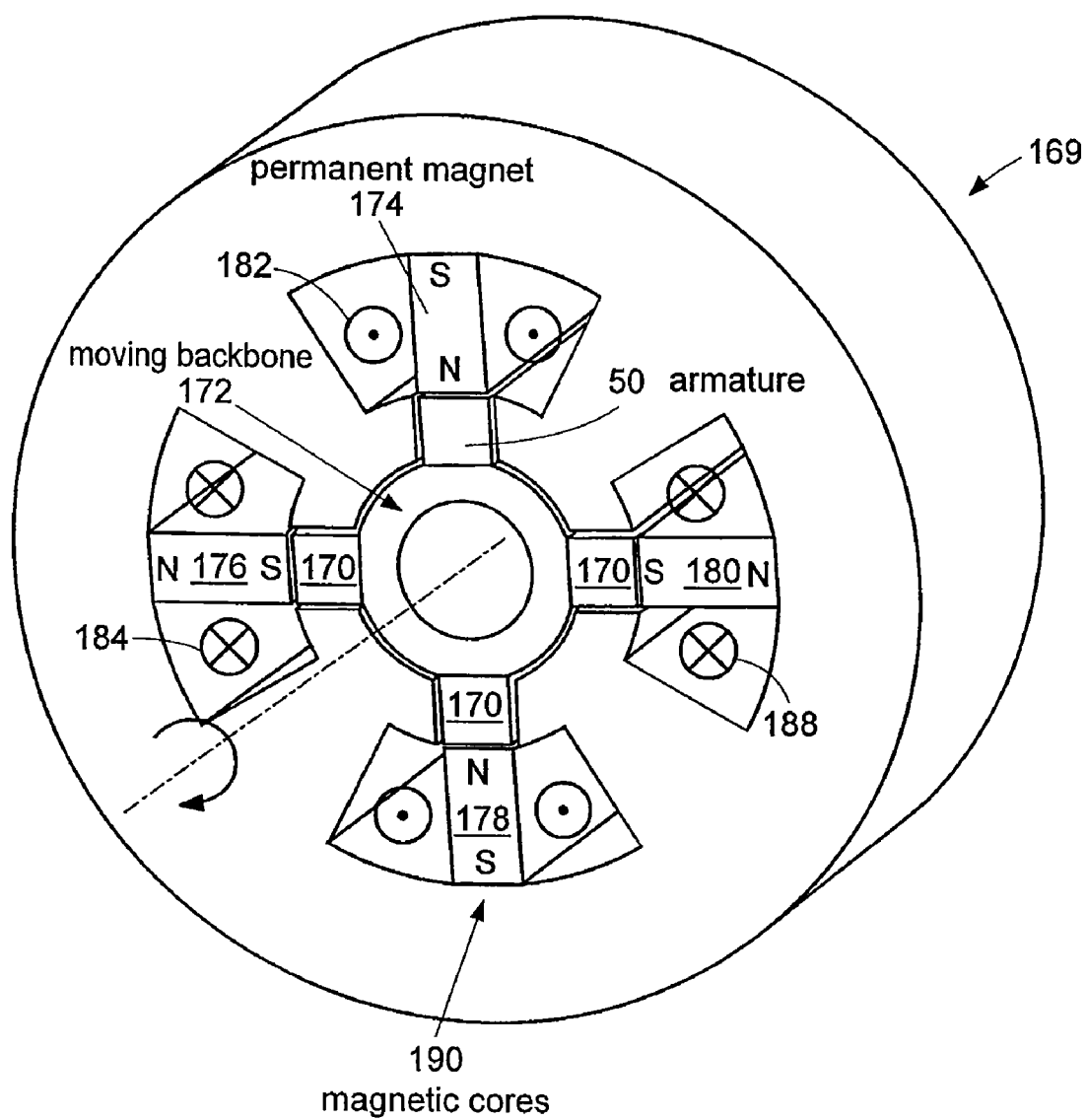
FIG. 10 illustrates an embodiment of an ultra fast rotary, motor that can be used for operating a cutting tool.

FIG. 10 illustrates a rotary embodiment 169 of FTS 12, which employs the principles discussed in conjunction with FIG. 9A. Rotary embodiment 169 includes a moving backbone 172 coupled to an armature 170. A rotary core 190 houses permanent magnets 174, 176, 178, 180, respectively. Each magnet includes a winding set having an AC current flow as shown. For example, magnet 174 has a winding employing a current flow 182 out of the page, magnet 176 has current flow 184 into the page, magnet 178 has current flow 186 out of the page, and magnet 180 has current flow 188 into the page. Moving backbone 172 may be fabricated out of lightweight material such as, but not limited to, silicon carbide. Armature 170 and magnetic core 190 can be made from nanocrystalline laminations or other soft magnetic material. A supporting bearing can be rubber or laminated rubber and fitted between magnets 174, 176, 178, 180 and armature 190. As with the linear tool system, the bias is directed through the outer radial surfaces of the armature to achieve efficient linear high frequency operation.

Figure 11:
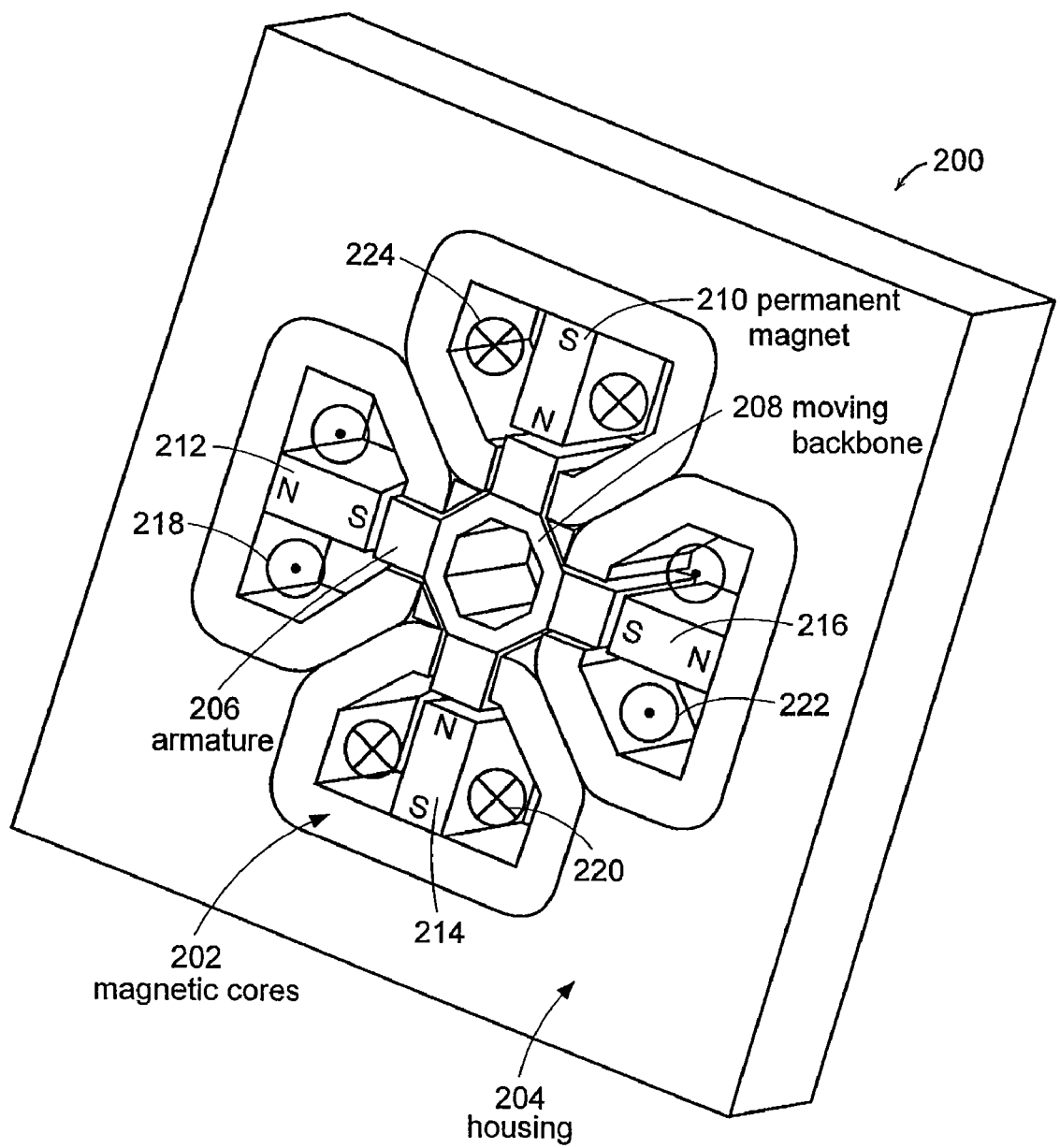
FIG. 11 illustrates an alternative embodiment of an ultra fast rotary motor having a substantially square housing.

FIG. 11 illustrates an alternative implementation for a rotary configuration of FTS. Rotary assembly 200 includes a magnetic core 202 retained in a housing 204. Within magnetic cores 202 are permanent magnets 210, 212, 214, 216 having respective windings with current directions 224, 218, 220, 222, respectively. Rotary assembly 200 also includes an armature 206 and moving backbone 208.

Figure 12:
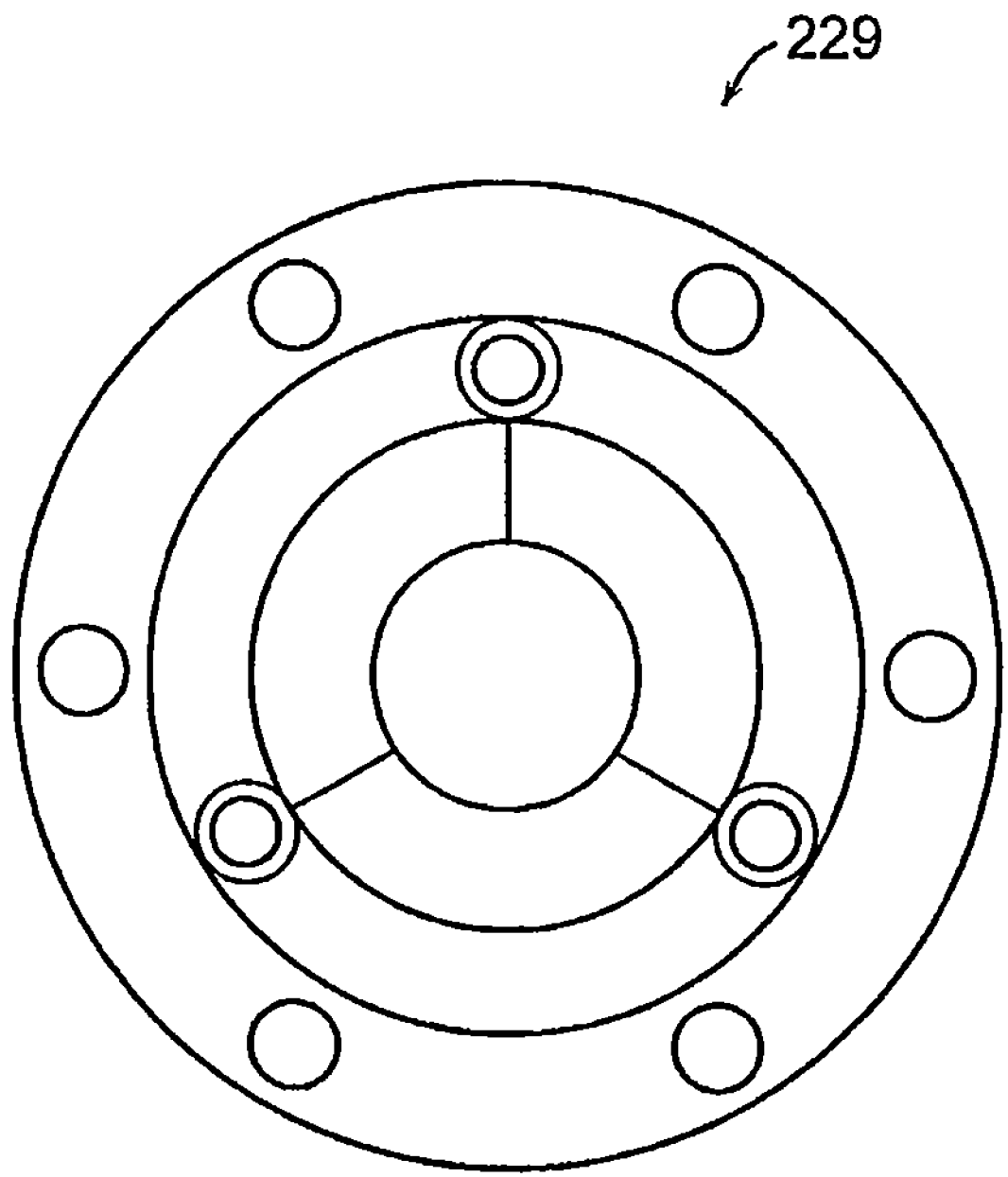
FIG. 12 illustrates a front body assembly having an armature in accordance with a preferred embodiment of the invention.

FIG. 12 illustrates a front body 229 containing an armature 46 and the flexure supporting the armature disk.

Figure 13A:
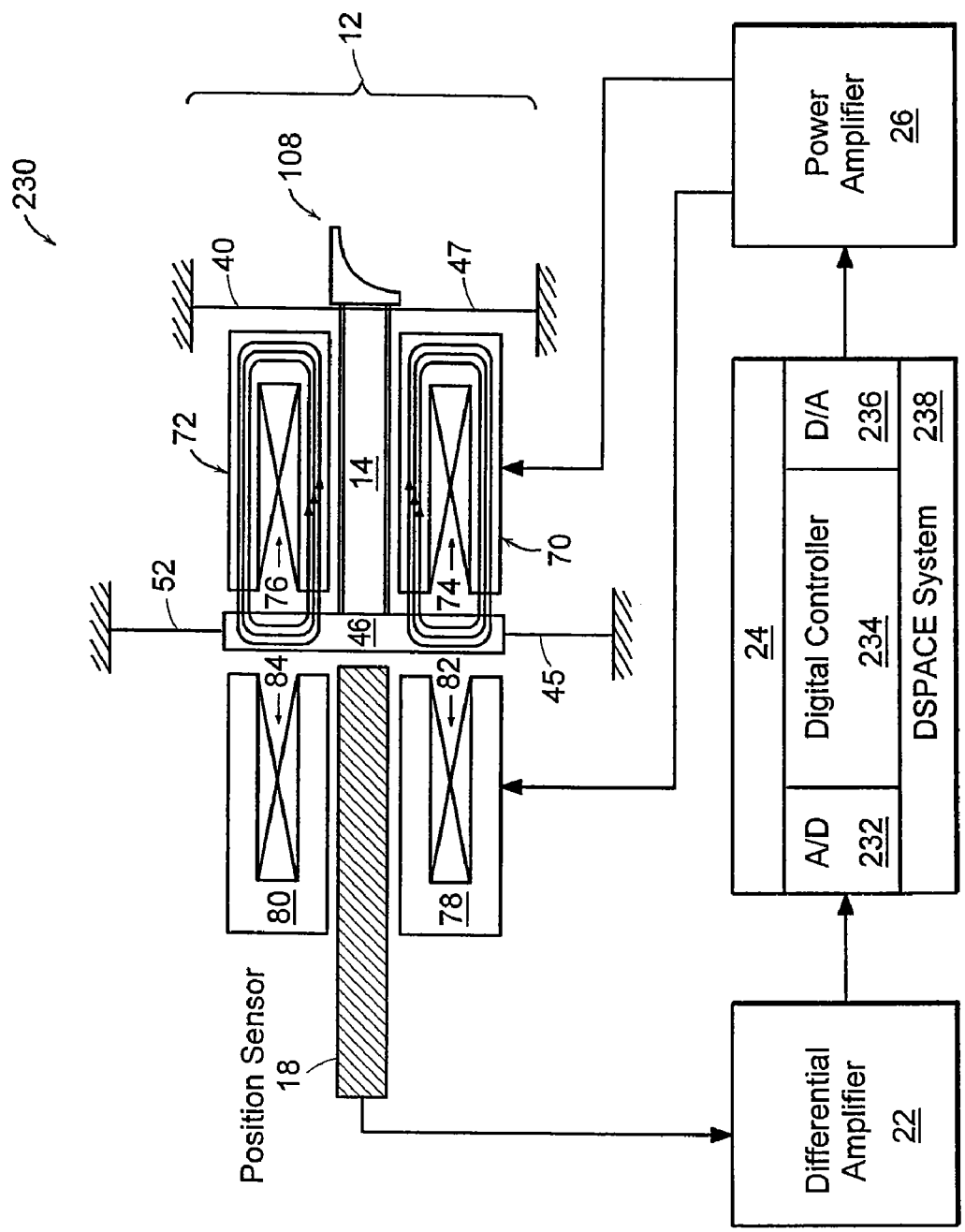
FIG. 13A illustrates a schematic representation of an embodiment of a fast tool servo and a controller.
Figure 13B:
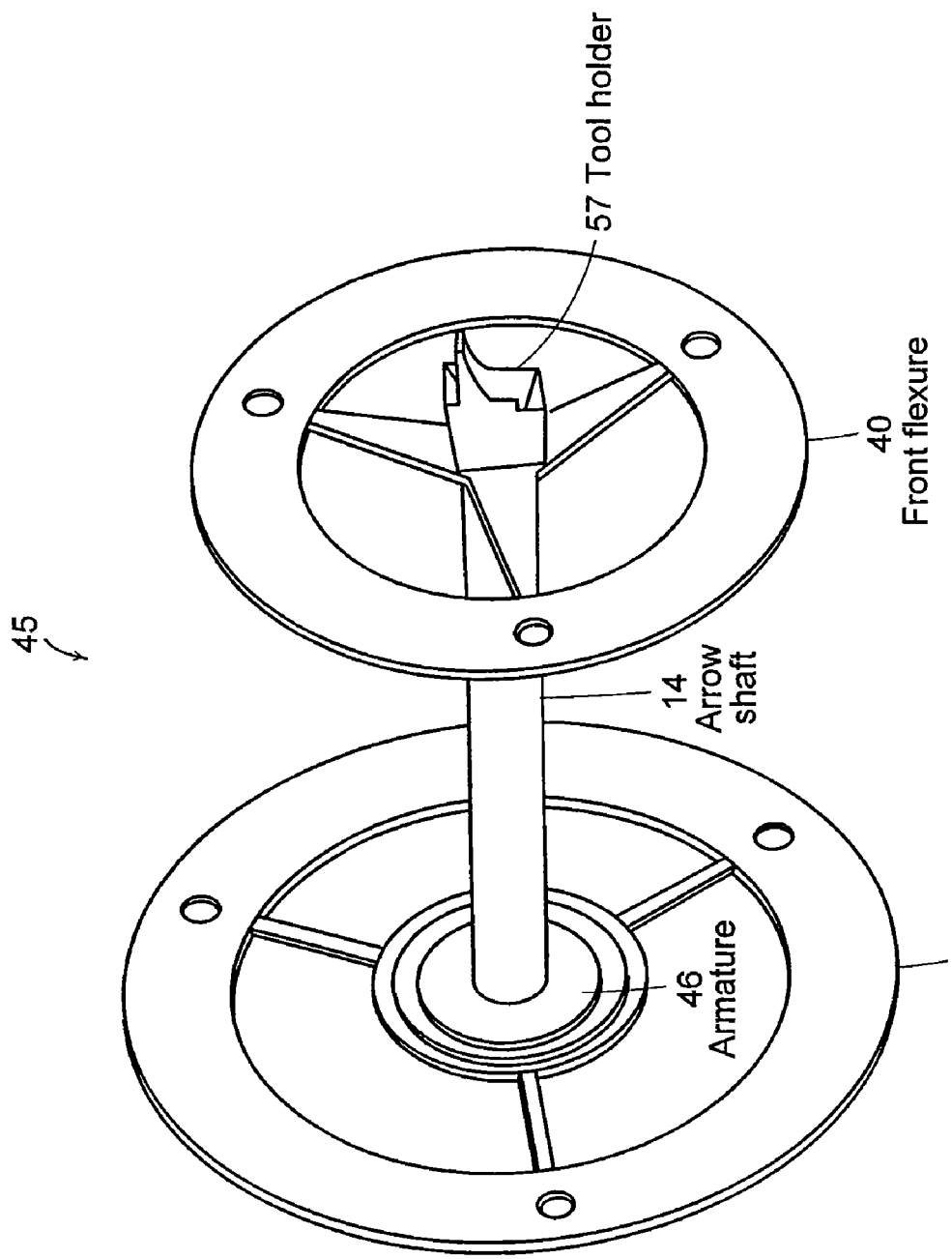
FIG. 13B illustrates a perspective view of the armature assembly with the flexure system in accordance with a preferred embodiment of the invention.

FIG. 13A illustrates a schematic representation of a system 230 for precisely operating tool tip 108. System 230 includes FTS 12, position sensor processor 18 implemented using a differential amplifier 22, power amplifier 26 and controller 24, including an analog-to-digital converter (A/D) 232 for receiving the position sensor signal, a digital-to-analog converter (D/A) 236 for producing an analog input signal to power amplifier 26, a digital controller 234 for executing machine-readable instructions necessary to control FTS 12, and a DSPACE digital control system for providing a user interface as well as machine-readable instructions to digital controller 234. The armature assembly 45 includes an armature 46 having flexures 40, 52 that provide lateral stiffness (FIG. 13B). The assembly also includes a tool holder 57 on the distal end of shaft 14.

Figure 14:
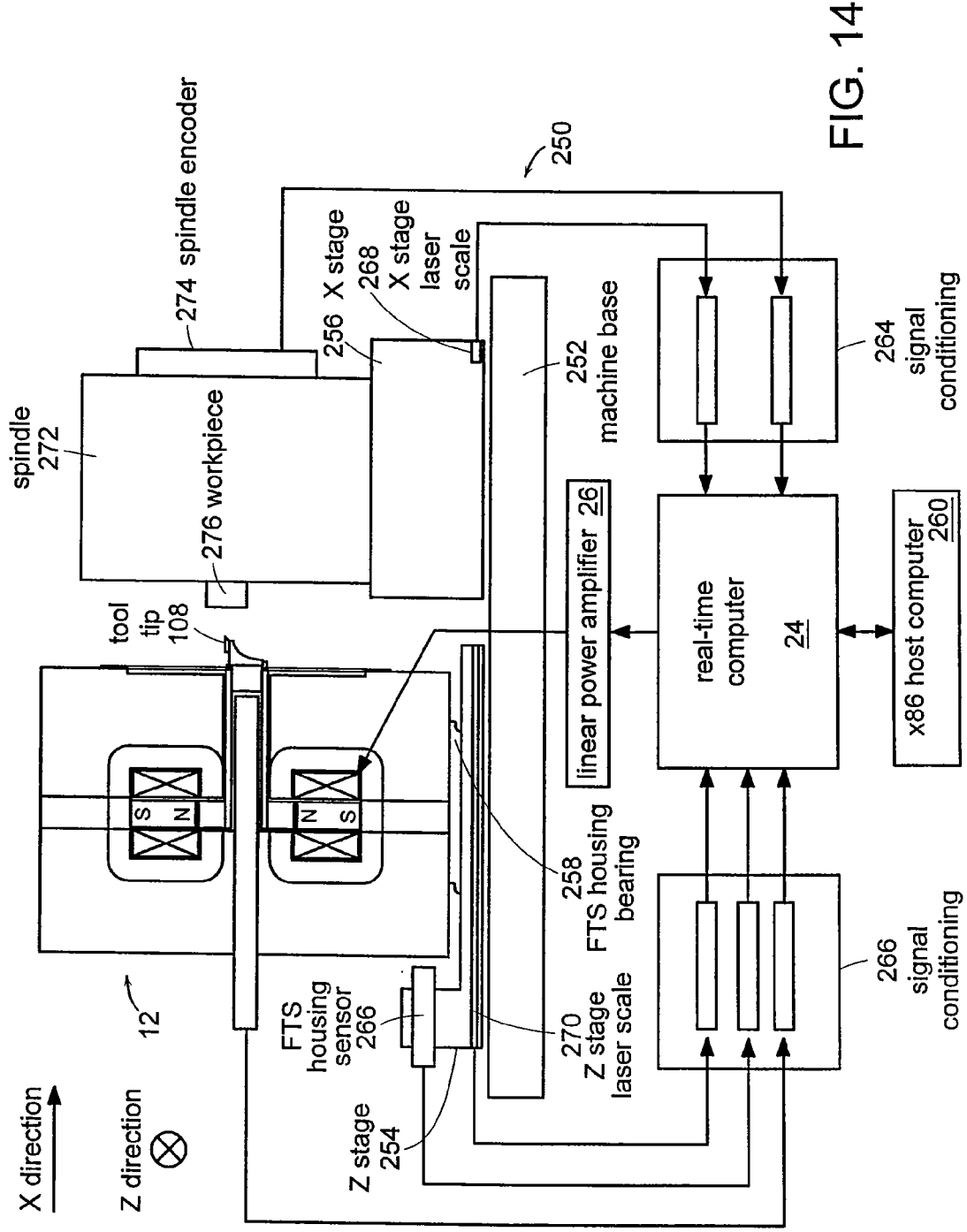
FIG. 14 illustrates a schematic representation of a fast tool servo based diamond turning machine.

FIG. 14 illustrates a system 250 for machining a workpiece in accordance with teachings herein. In particular, system 250 is a diamond turning machine (DTM). The DTM 250 is composed of three main parts: a machine base 252, a Z stage 254, and an X stage 256. The machine base 252 is made from concrete or granite, and is isolated from ground vibration by air legs and/or active vibration isolation systems. The X and Z stages are supported by a hydrostatic bearing system on the machine base 252, so that they can move along X and Z directions as shown in FIG. 14, respectively. The X stage 256 and Z stage 254 may be driven by linear motors.

On top of the X stage 256 is installed the spindle 272, which is supported by an air bearing. The workpiece 276, to be machined, is installed in the front end of spindle 272. A spindle encoder 274 is mounted at the back end of spindle 272 to measure the spindle rotation angle. FTS 12 is installed on Z stage 254 via FTS housing bearing 258, which guides the FTS housing to move only in Z direction relative to Z stage 254. FTS housing sensor 266 measures the position of the FTS 12 relative to Z stage 254. Tool tip 108 is installed in the front end of FTS 12. Z stage laser scale 270 measures the motion of Z stage 254 in the Z direction, while the X stage laser scale 268 measures that of X stage 256 in X direction. Position signals are fed into real-time computer 24 via signal conditioning modules 266 and 264, respectively. Real-time computer 24 outputs control signals to the linear power amplifier 26, which in turn drives the coils inside the FTS 12. A host computer 260 may communicate with real-time computer 24 to display the working status of system 250, and to receive commands from an operator. With appropriate motion coordination of X stage 256, Z stage 254, the spindle 272, and the FTS 12, arbitrarily shaped surfaces can be machined on workpiece 276 with high precision.

Figure 15A:
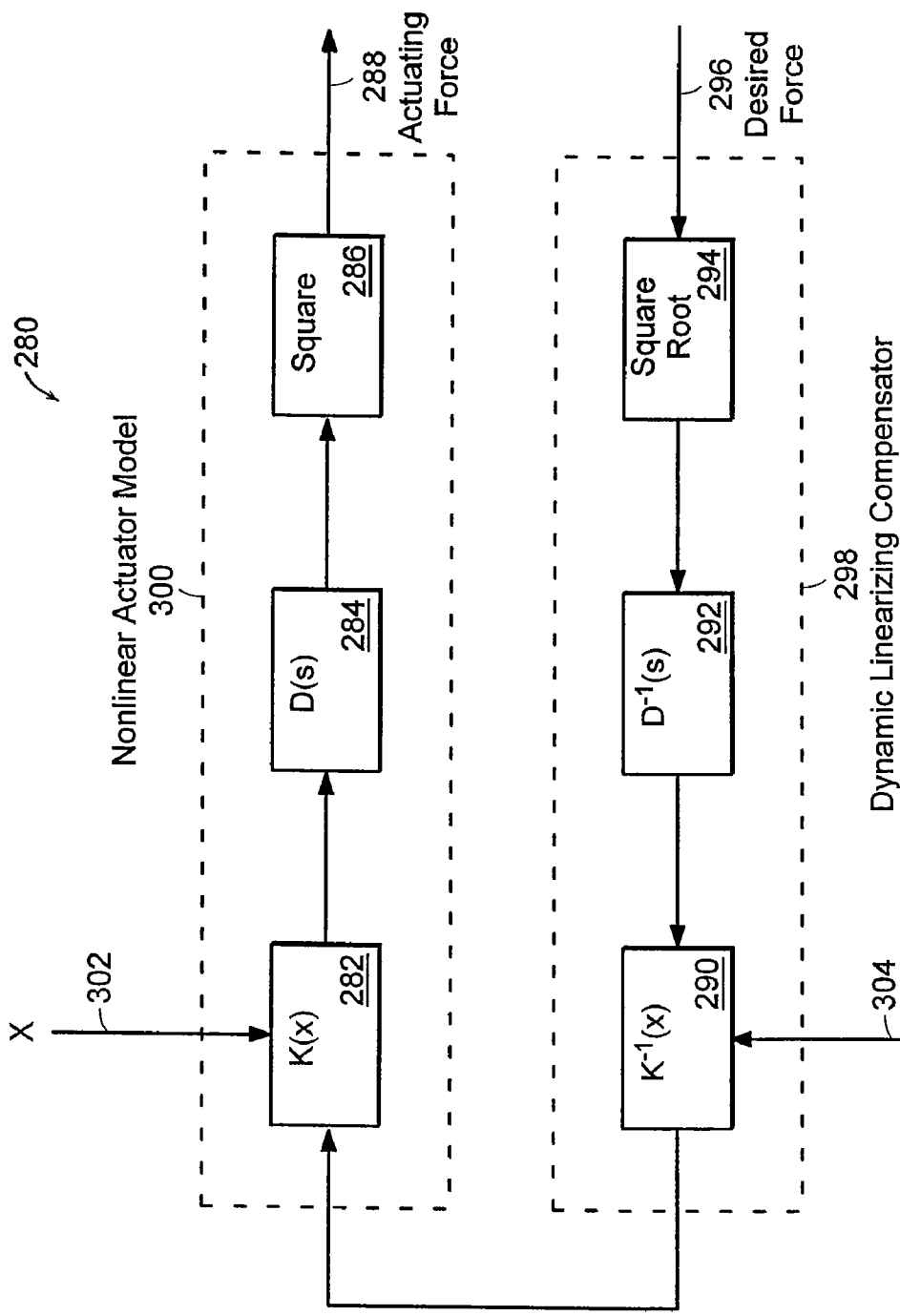
FIGS. 15A-15C illustrate exemplary control algorithms useful for operating embodiments of a fast tool servo.

FIG. 15A illustrates an exemplary control algorithm 280 that can be utilized in conjunction with FTS 12 and DTM 250. Electromagnetically driven actuators can be difficult to control in the sense that the actuating force is proportional to the current squared and inversely proportional to the air gap squared. Moreover, the force decreases with frequency because the magnetic field cannot penetrate the magnetic material at high frequencies. In order to compensate for these non-linear and frequency dependent characteristics, a dynamic non-linear compensation (DNC) control method 280 as shown in FIG. 15A is applied. Here K(x) 282 represents the relation between current and magnetic field, D(s) 284 the eddy current effect, and the "Square" block 286 relates the magnetic flux to the actuating force. This DNC control method uses a compensator 298 to partially compensate the non-linearity of the actuator, but is not expected to linearize the actuator completely because it is a feed-forward model-based method and modeling errors may exist. The whole position control loop is compensated with a lead-lag controller (including notch or resonant elements) and low-frequency integrator.

Figure 15B:
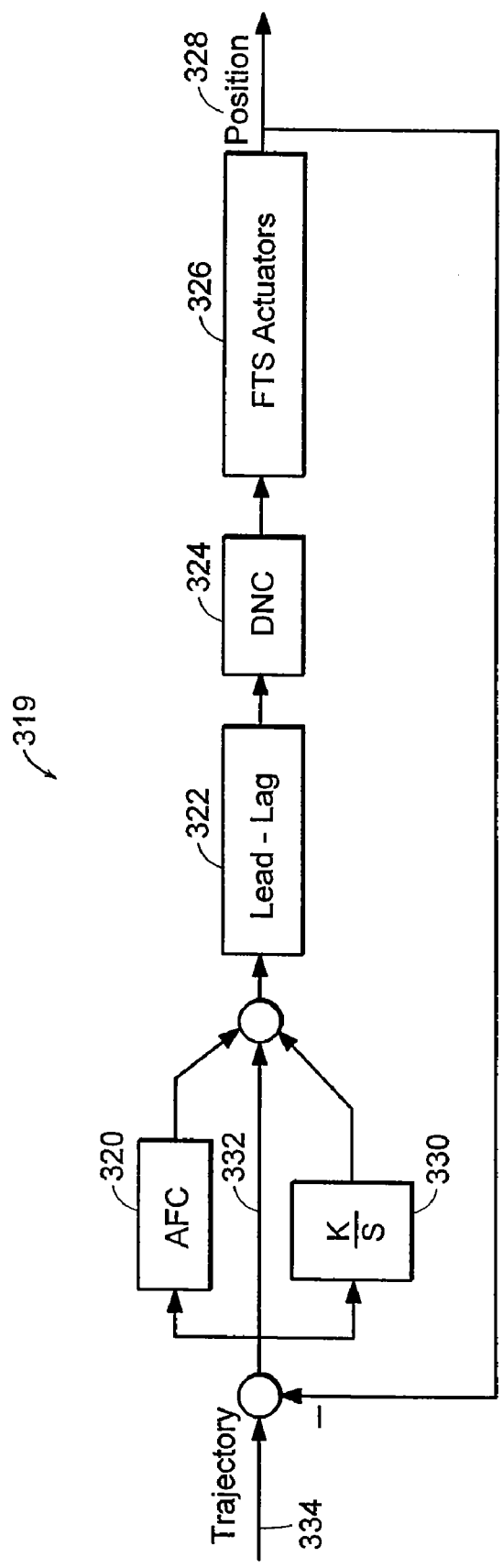
Figure 15C:
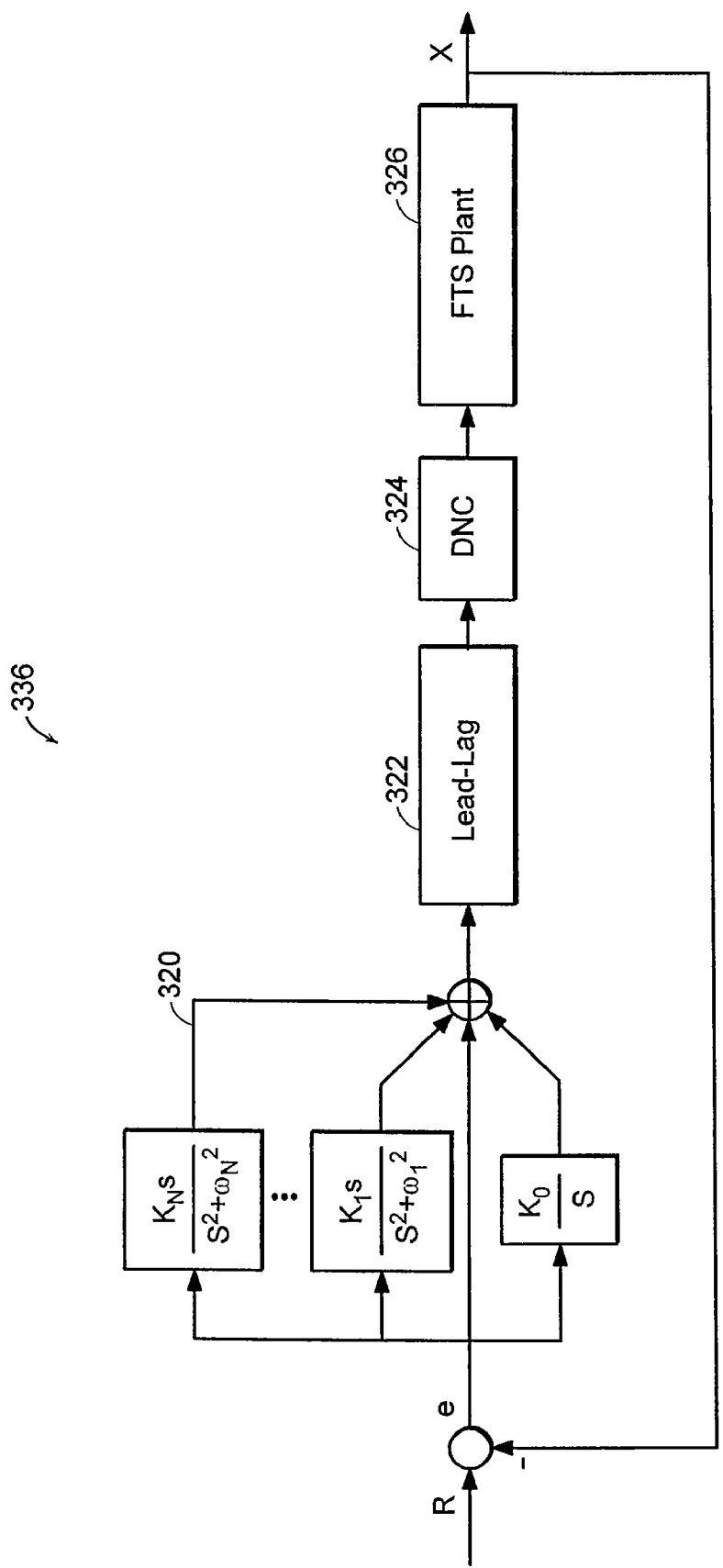

Different details of the system controller in accordance with a preferred embodiment of the present invention are shown in FIG. 15B and FIG. 15C. At the spindle rotational frequency and its higher harmonics, a plug-in type adaptive-feed forward-compensation (AFC) controller 320 is used to improve the rejection of spindle-generated disturbance and to improve the spindle-synchronized trajectory tracking performance. The lead-lag controller 322 and the DNC 324 control provide the control mechanism for the FTS actuators 326. The position of the actuator provides the feed back control input into the control system 319.

Figure 16A:
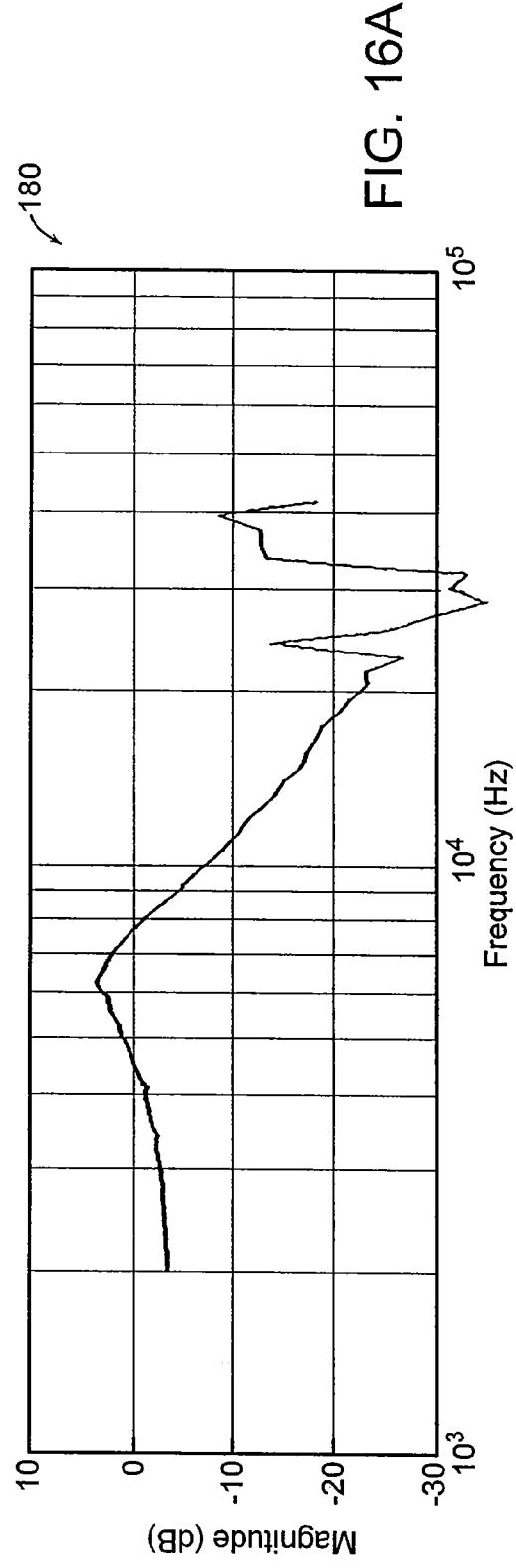
FIGS. 16A and 16B illustrate the closed loop frequency response, magnitude and phase, respectively, with respect to frequency in accordance with an embodiment of the invention.
Figure 16B:
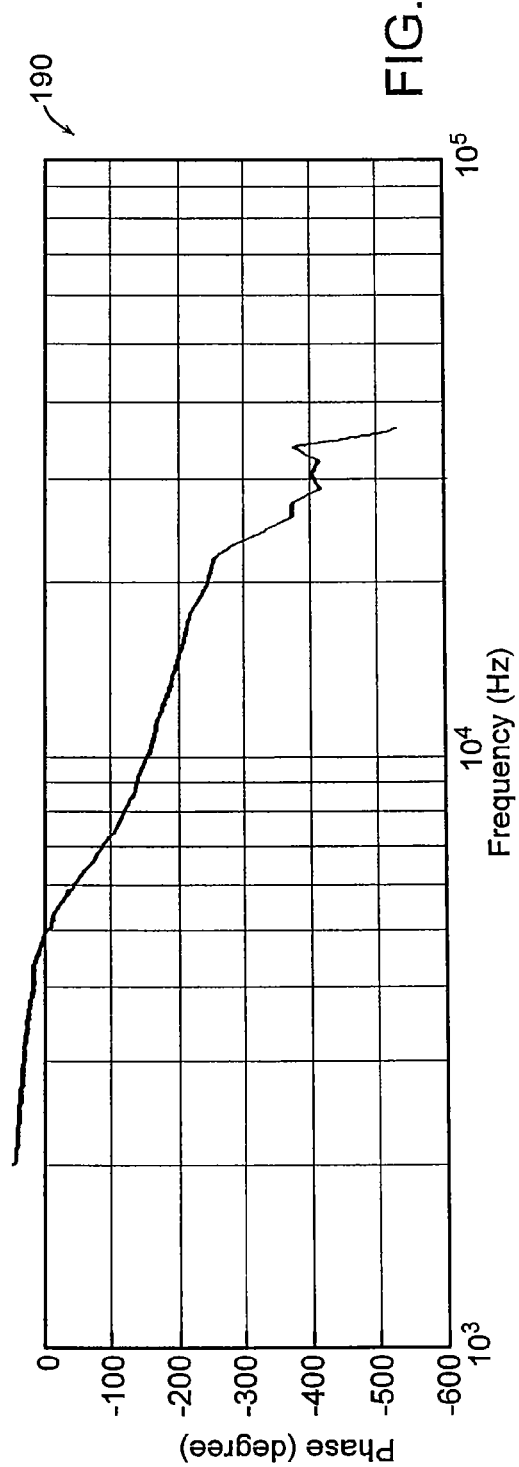
Figure 16C:
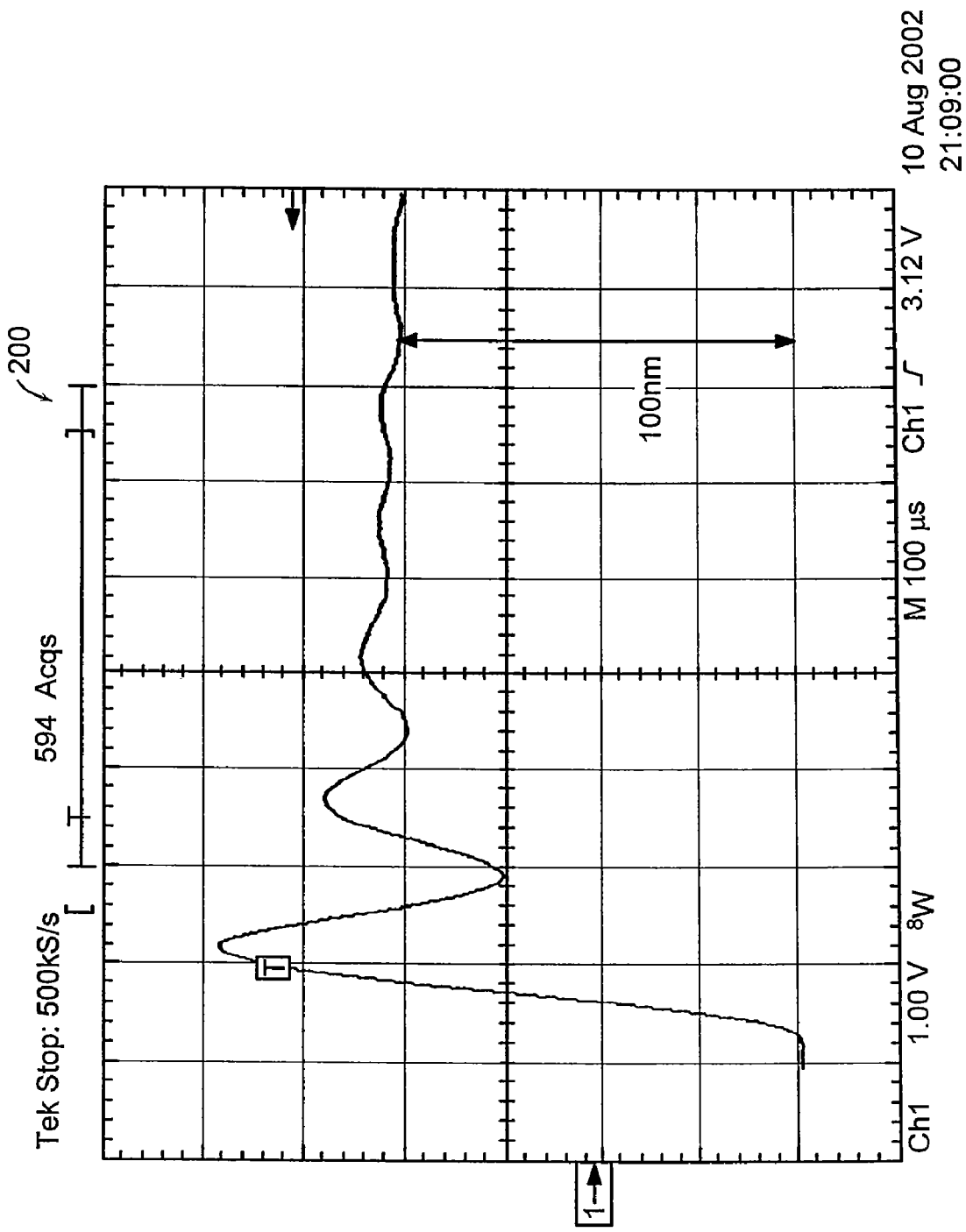
FIG. 16C illustrates a small signal closed loop step response in accordance with a preferred embodiment of a fast tool servo.

In one preferred embodiment, the controller is implemented with a DSPACE 1103 board, for example, wherein all the digital controllers are in the discrete domain. The full stroke of 50 µm can be achieved up to 1 kHz operation. The maximum acceleration is 160 G's when tracking a 9 µm peak-to-valley 3 kHz sine wave. For a sampling frequency of 100 kHz, the closed-loop frequency response is shown in FIG. 16A and FIG. 16B. The small signal bandwidth can be as high as 10 kHz. For a sampling frequency of 83 kHz, the closed loop bandwidth is 8 kHz. The 100 nm closed-loop step response is shown in FIG. 16C.

The position error is approximately 1.2 nm RMS when the spindle is turned off. After the spindle is turned on, the error degrades to 3.5 nm RMS because of the pulse width modulation (PWM) noise from the spindle amplifier. To evaluate the tracking performance, a 10 µm peak-to-valley 1 kHz sine wave trajectory may be applied to drive the fast tool servo. When the AFC is not included in the control loop, the tracking error is approximately 1.048 µm RMS. When the first harmonic AFC is applied, the error is reduced to approximately 0.0214 µm RMS. The tracking error reduces to approximately 0.0148 µm RMS when the second harmonic AFC is further applied and to approximately 0.0073 µm RMS when the third harmonic is also added. This illustrates that the non-linearity of the actuator and the power amplifier introduces disturbance forces of second and higher order harmonics, and the AFC of poles at multiple harmonic frequencies can significantly improve the tracking error. FIG. 16D illustrates tabulated results showing the performance of the adaptive feed forward control in accordance with a preferred embodiment.

Figure 17A:
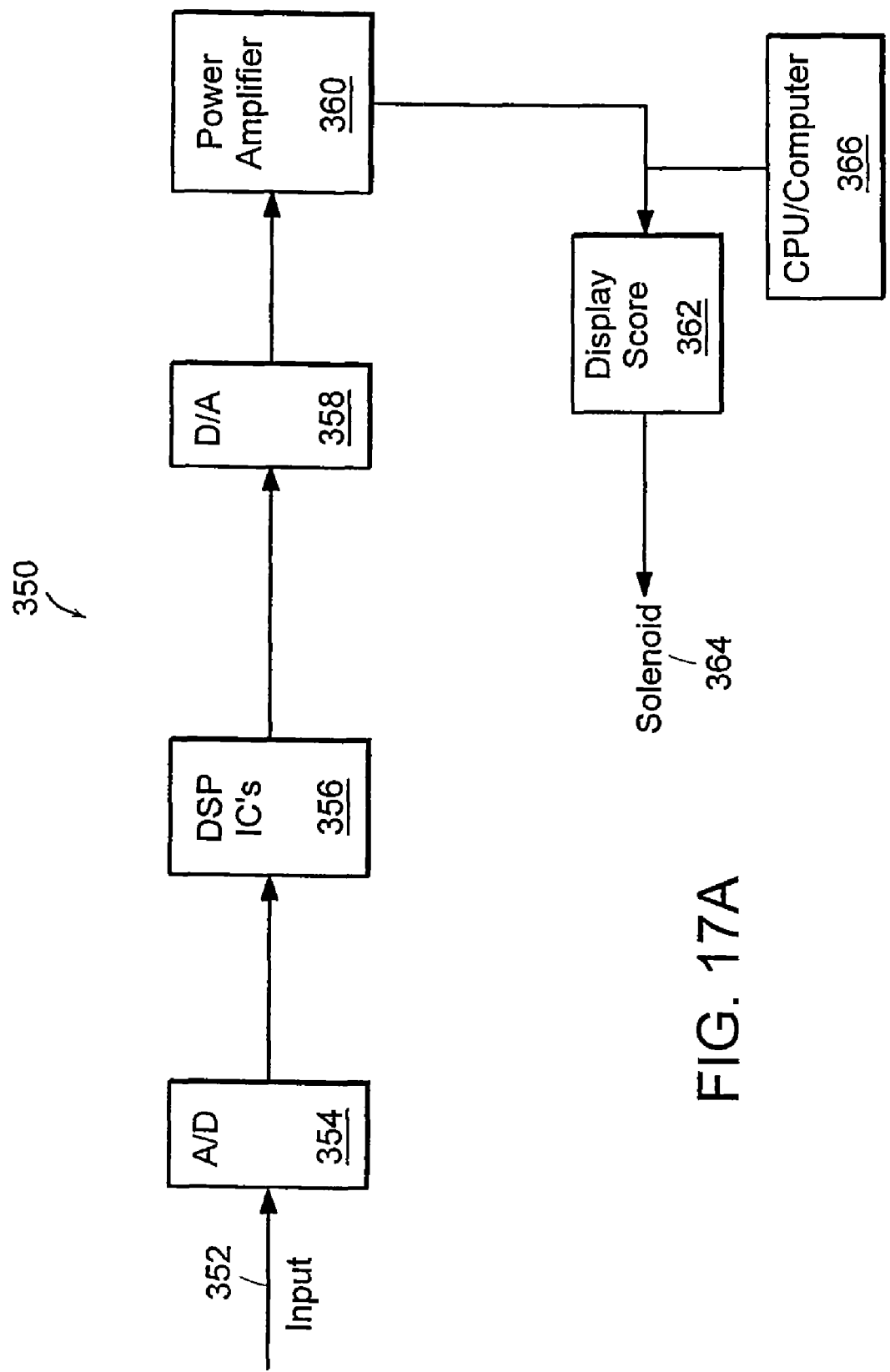
FIGS. 17A and 17B illustrate embodiments of a controller that can be used for operating a fast tool servo.

In accordance with an alternative preferred embodiment, the controller 300 includes at least three digital signal processing (DSP) integrated circuit chips such as, for example, TS 101 chips provided by Analog Devices. These may be multiple DSP chips. The bandwidth of the FTS can be increased to approximately 20±5 kHz using the DSP chips. In an embodiment of controller 380 a computation power on the order of 5.4 G FLOPS is achieved using three DSP's 382A-C operating in parallel at speeds of 300 MHz. This embodiment produces a 1 MHz control loop having a delay on the order of 1.8 μs. Total harmonic distortion for A/D 392 and D/A 398 is less than −88 dB up to 50 kHz. Therefore, embodiments of system 10 can operate with tool speeds on the order of 50 kHz. FIG. 17A illustrates a schematic diagram of the control system 350 in accordance with a preferred embodiment of the present invention using the DSP integrated circuits 356. The input 352 is indicative of the position information of the actuators.

In a preferred embodiment, the signal 352 is the output from the capacitance probe 18. The input signal is digitized by the analog to digital (A/D) converter circuit 354, the output of which forms the input to the DSP control circuit 356. The output of the DSP circuit is then converted to an analog signal by the D/A converter circuit 358 and the output of which forms the input to the power amplifier 360. The output of the power amplifier is provided to the solenoids. An oscilloscope or display unit 362 can be used in the control loop in a preferred embodiment. Additionally a central processing unit 366 or a computing device such as, for example, a high-speed real time computer can be included in the control loop to monitor the control system. Memory units can also be added in preferred embodiments. Flux feedback and sensing elements can also be incorporated in the preferred embodiment FTS.

Figure 17B:
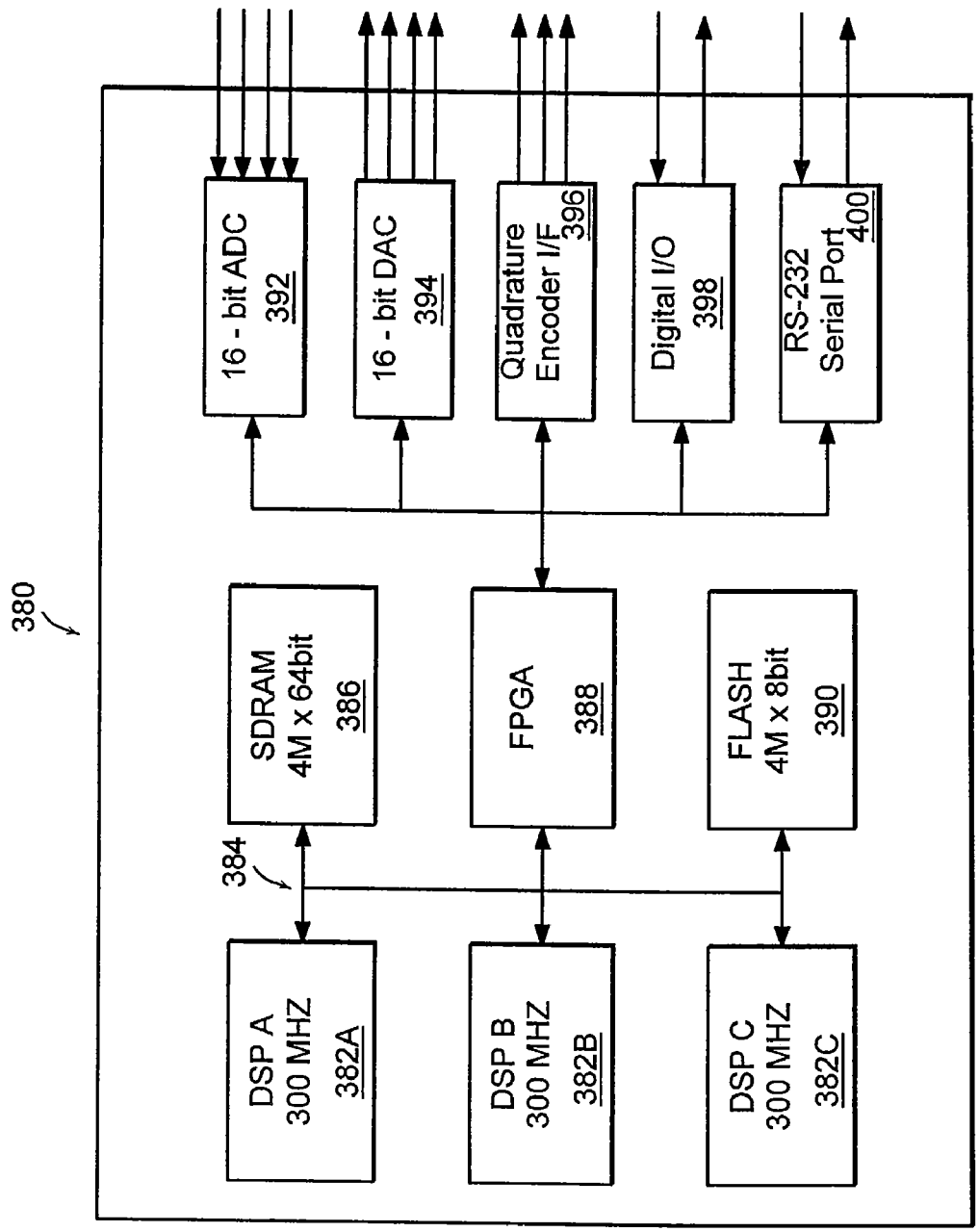

FIG. 17B is a schematic block diagram of the real time computer 380. Computer 380 includes three digital signal processors (DSP 382A, DSP 382B, and DSP 382C), which share a common cluster bus 384 with the synchronous dynamic random access memory (SDRAM) 386, the field programmable gate array (FPGA) 388, and the electrically-erasable read only memory (FLASH) 390. Through the FPGA 388, three processors 382A-C can read/write 392 peripheral resources, such as 16-bit analog-to-digital converters (ADC), 16-bit digital-to-analog converters (DAC) 394, quadrature encoder interfaces 396, digital inputs/outputs (I/O) 398, and RS-232 serial port 400. The tool tip sensor 18 and the FTS housing sensor 266 are fed into the ADC of the real-time computer. The Z-stage laser scale 270, the X-stage laser scale 268 and the spindle encoder 274 connect to encoder interfaces of the real-time computer. The DACs 394 output control signals to the linear power amplifier 26. The real-time computer communicates with host computer 260 via RS-232 serial port 400.

Figure 18A:
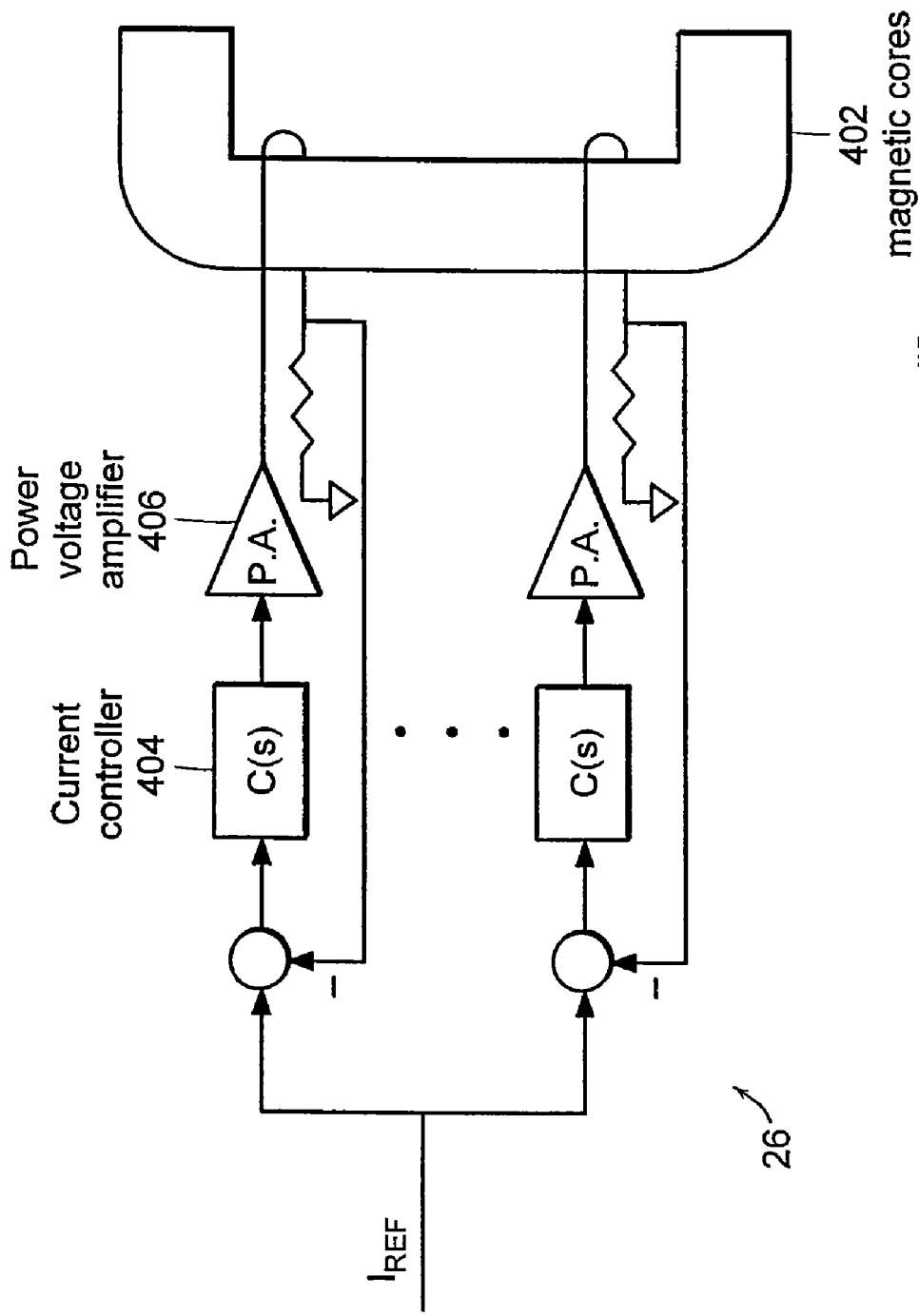
FIGS. 18A through 18C illustrate schematic representations of embodiments of a power amplifier that can be used when practicing embodiments of a fast tool servo.

FIG. 18A is a block diagram of power amplifier 26. Magnetic cores 402 are a representation of the magnetic path composed by the front core 70, the middle core 92, the rear core 78, and armature 46. Surrounding the magnetic cores 402, multiple-start windings are driven separately by power voltage amplifiers 406 in parallel. The current of each winding is controlled independently with separate current controllers 404, which are driven by the same reference current signal $I_{REF}$.

Figure 18B:
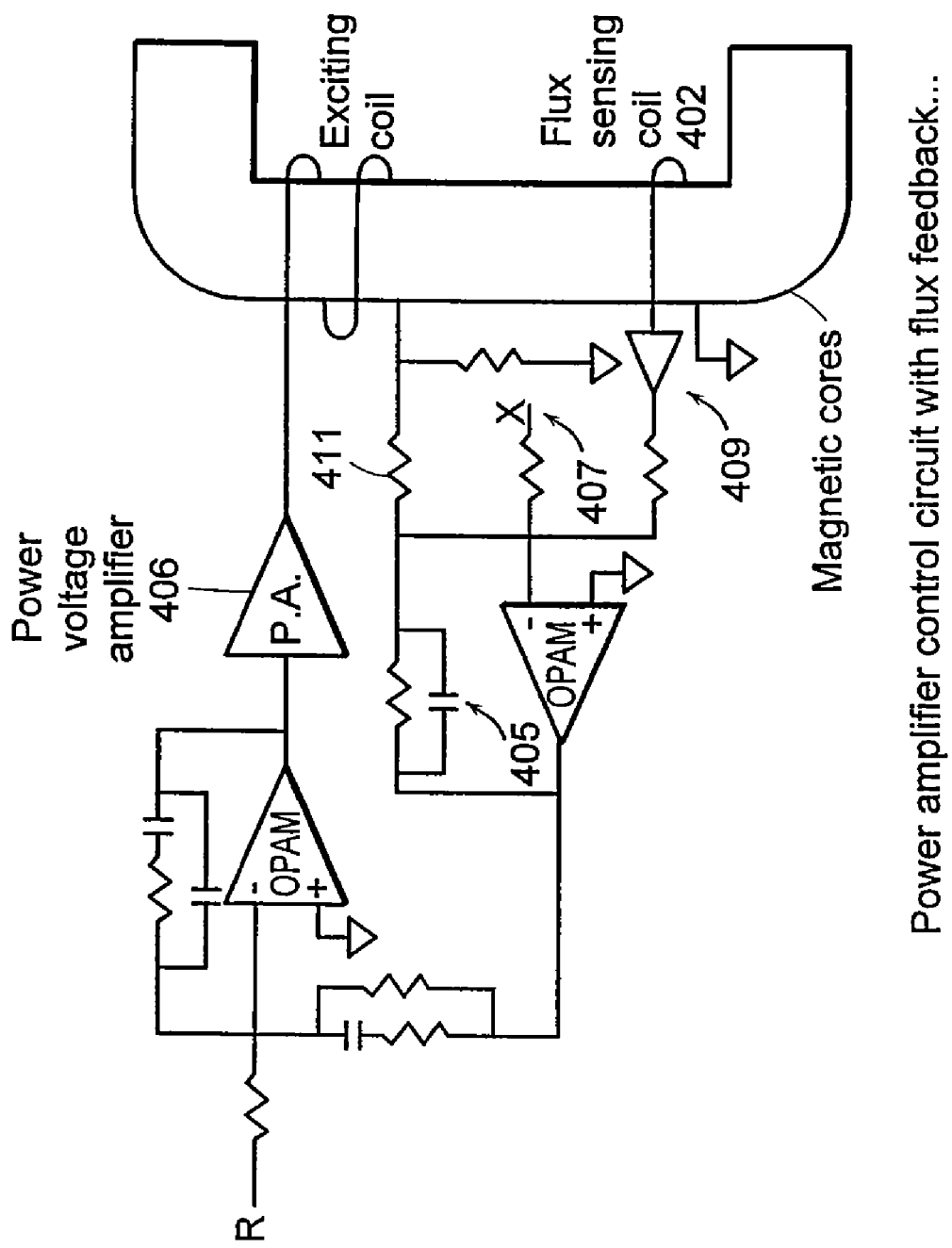

FIG. 18B illustrates the power amplifier circuit in greater detail. The embodiment of FIG. 18B produces 1 KW of output power over a linear range. Four APEX PA52A amplifiers are driven in parallel to drive the excitation coils 74, 76. Using fluxing sensing coils 402, a flux sensing circuit 409 is integrated into the current feedback path as shown in FIG. 18B to feed back the generated flux at high frequencies. The embodiment of FIG. 18B works in current mode at low frequencies, and works in flux mode at high frequencies where the current feedback signal rolls down and the flux feedback signal rolls up. The circuit includes current sensor 411 and low pass filter 405. Consequently, better linearity can be achieved at high frequencies. Additionally, armature position x-407 is fed back to compensate the negative spring effect of the ultra fast motor using an analog feedback loop, which maintains a higher bandwidth than a comparable digital implementation.

Figure 18C:
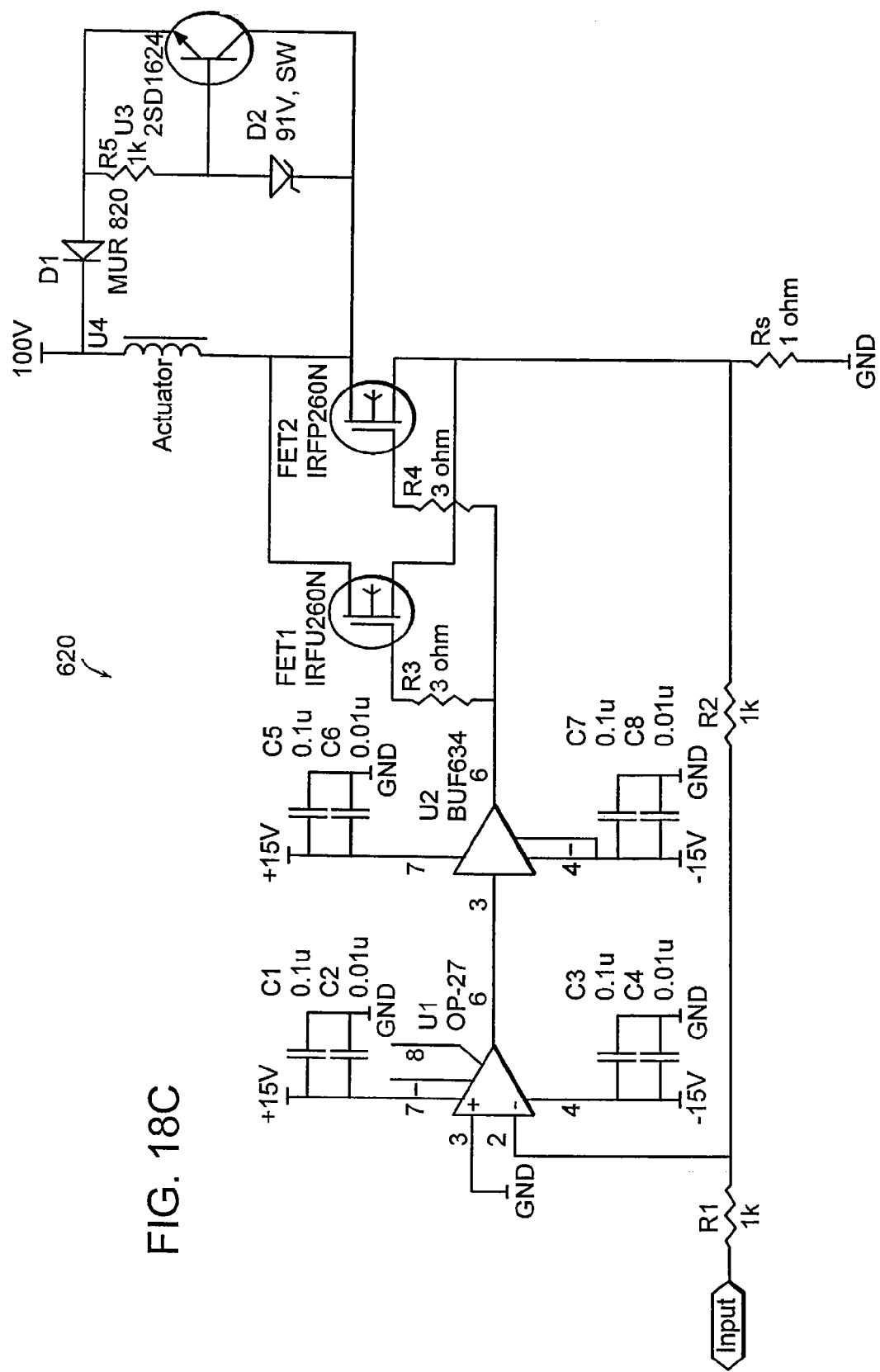

FIG. 18C contains a more detailed schematic diagram of power amplifier 26.

Figure 19A:
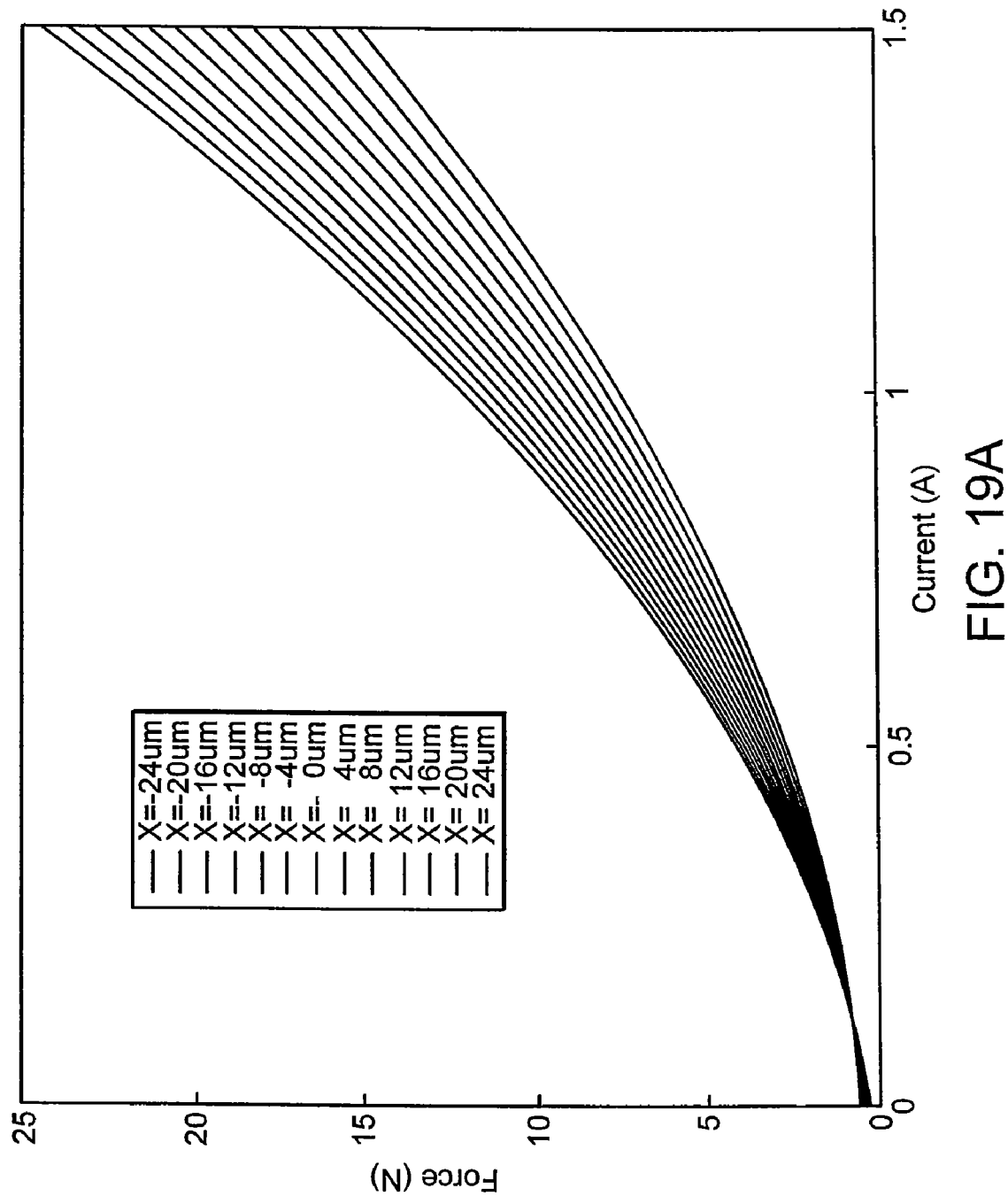
FIG. 19A illustrates the static performance of the actuator in accordance with a preferred embodiment of the present invention, in particular, a plot of force (N) versus current (A)

FIG. 19A illustrates the static performance of the actuator in accordance with a preferred embodiment of the present invention, in particular, a plot of force (N) versus current (A). FIGS. 19B and 19C illustrate the dynamic performance of the actuator in accordance with a preferred embodiment of the present invention.

Figure 19D:
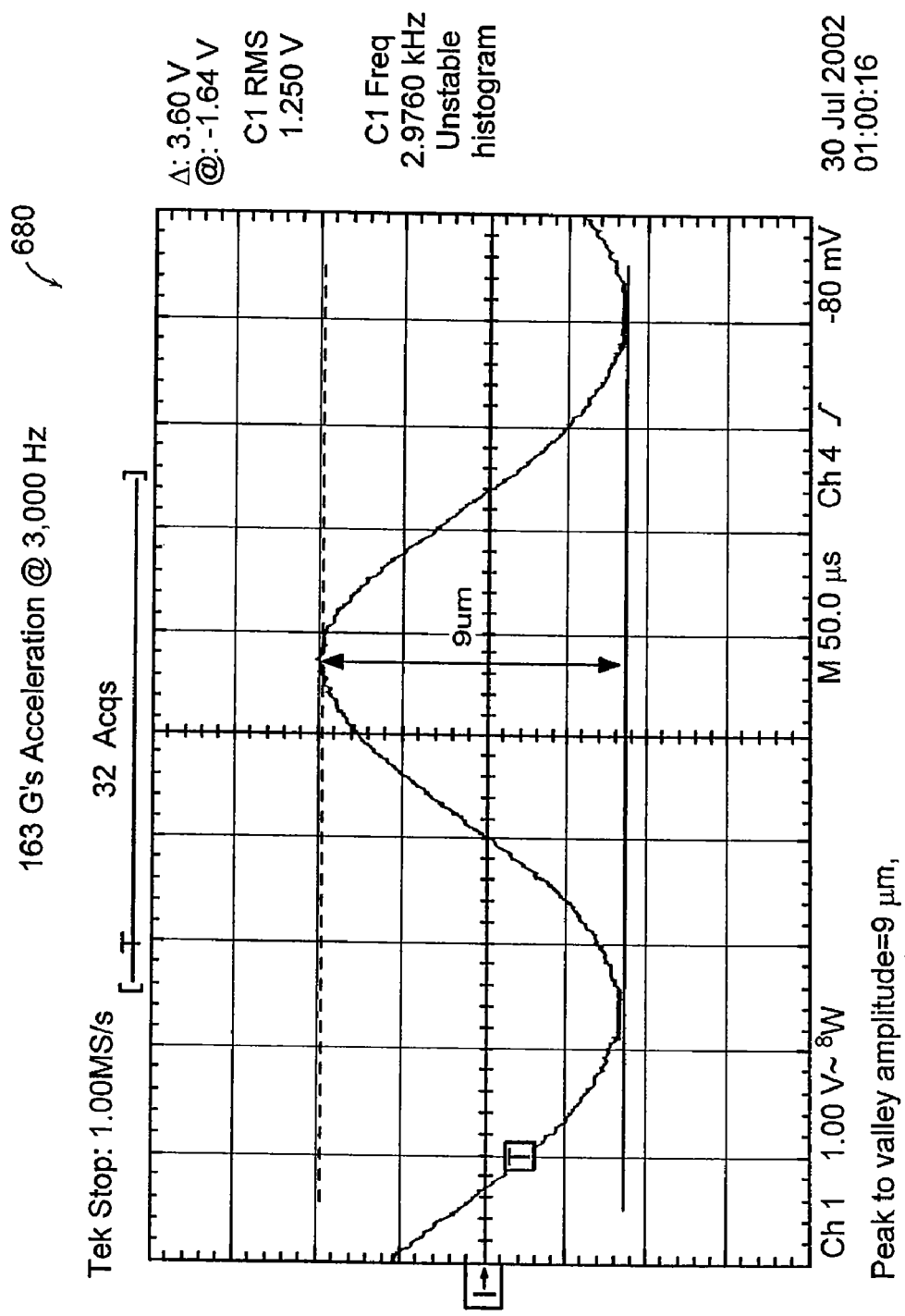
FIG. 19D illustrates the acceleration of the fast tool servo when tracking a 9 μm peak-to-valley 3 kHz sine wave in accordance with a preferred embodiment of the present invention.
Figure 19E:
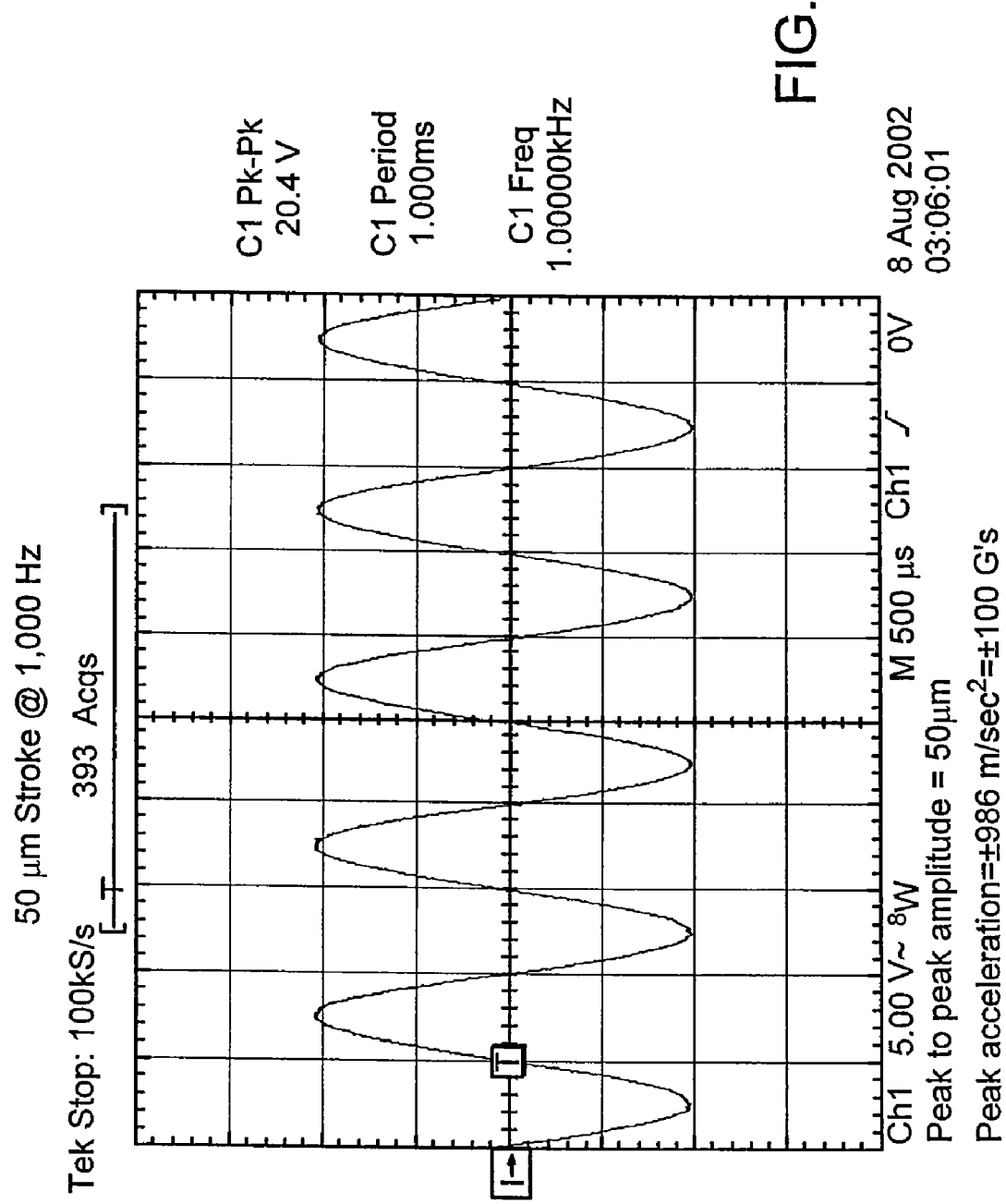
FIG. 19E illustrates the full stroke of 50 μm that is achieved at 1 kHz operation of a fast tool servo in accordance with a preferred embodiment of the present invention.

FIG. 19D illustrates the acceleration of the fast tool servo when tracking a 9 μm peak-to-valley 3 kHz sine wave in accordance with a preferred embodiment of the present invention. FIG. 19E illustrates the full stroke of 50 μm that is achieved at 1 kHz operation of a fast tool servo in accordance with a preferred embodiment of the present invention.

Figure 19F:
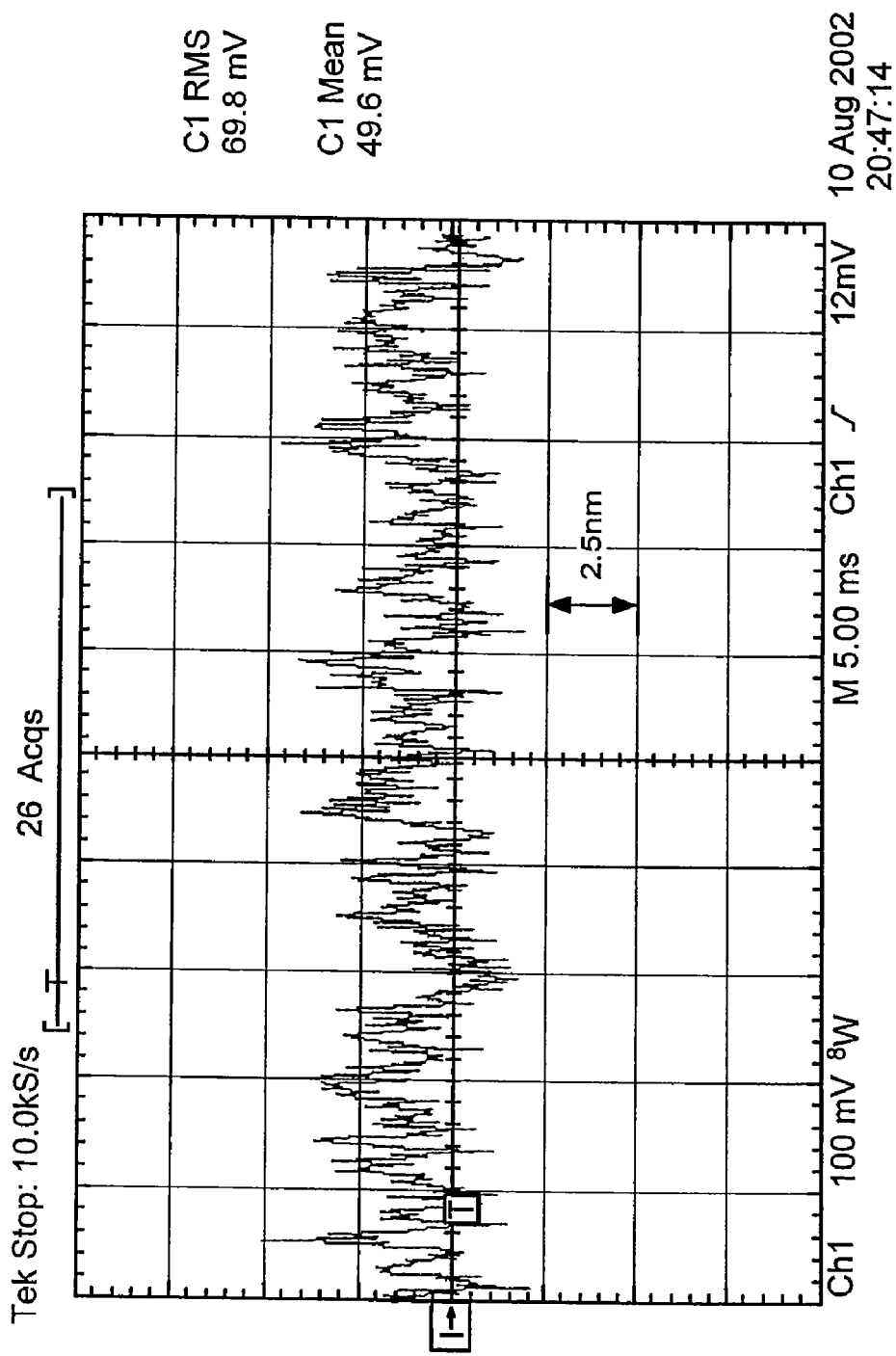
FIG. 19F illustrates graphically a 1.2 nm RMS error when the spindle is off in accordance with a preferred embodiment of the present invention.
Figure 19G:
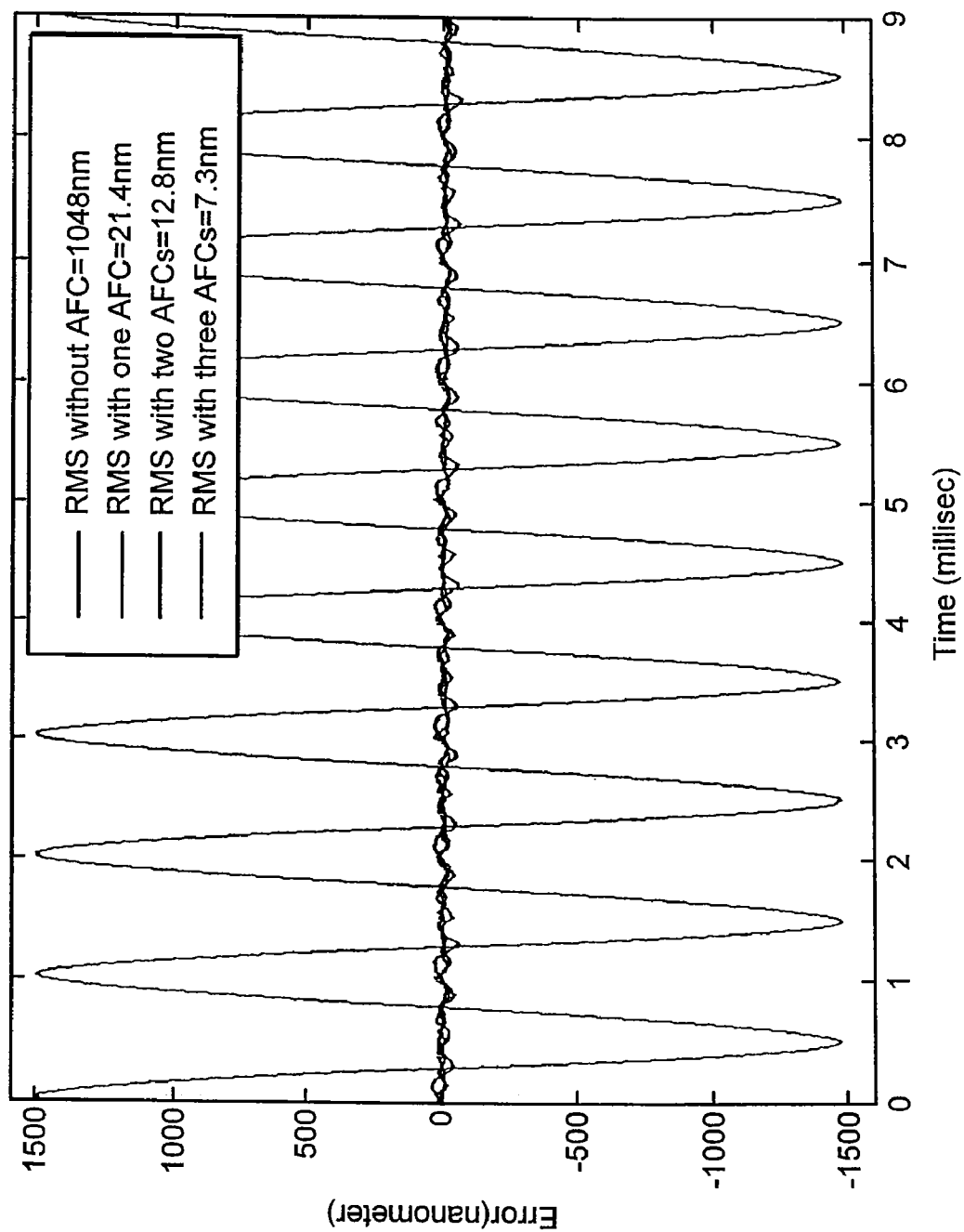
FIG. 19G graphically illustrates the error in tracking a 10 μm, 1 kHz sinusoidal signal in accordance with a preferred embodiment of the present invention.

FIG. 19F illustrates graphically a 1.2 nm RMS error when the spindle is off in accordance with a preferred embodiment of the present invention. FIG. 19G graphically illustrates the error in tracking a 10 μm, 1 kHz sinusoidal signal in accordance with a preferred embodiment of the present invention.

Figure 20A:
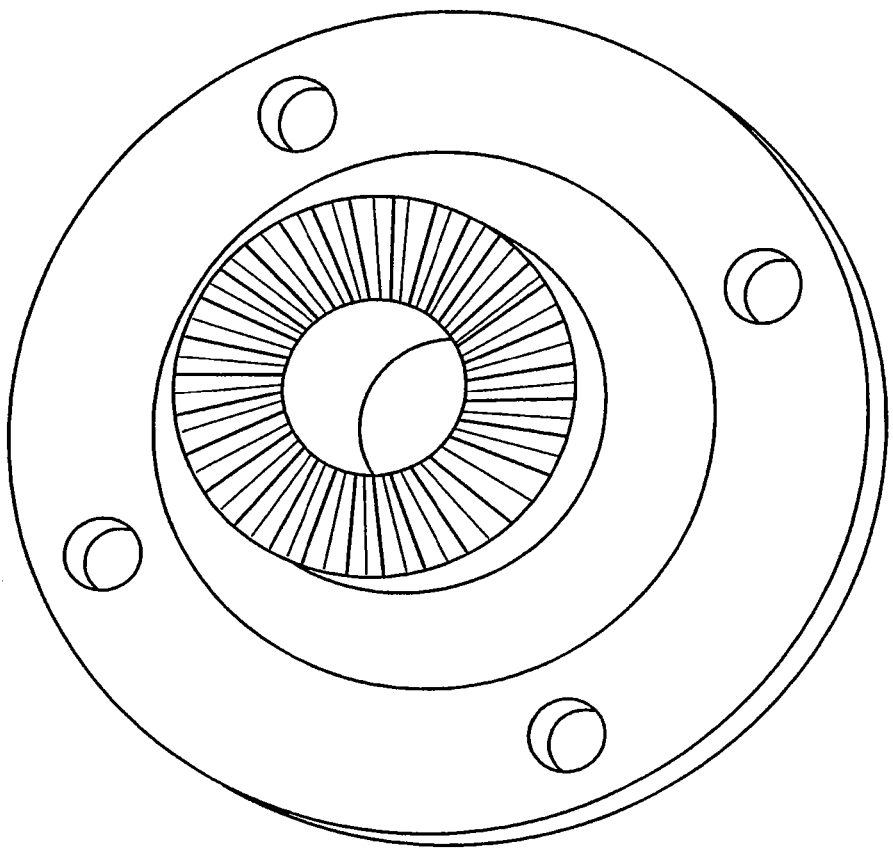
FIG. 20A illustrates a diamond turned part provided by the electromagnetically driven FTS in accordance with a preferred embodiment of the present invention.

FIG. 20A illustrates a diamond turned part provided by a preferred embodiment of an electromagnetically driven FTS. The surface is machined by face turning. The cutting is conducted using a Moore diamond turning machine. A DSPACE 1103 board controls both the X-Z slides of the machine and the FTS as described with respect to one preferred embodiment. A multiple sampling rate system is implemented. The sampling rate for the FTS controller is 83 kHz and the sampling rate for the spindle and X-Z slides controller is 4 kHz to ensure that the slides controls achieve 100 Hz bandwidth. The spindle speed is approximately 1800 rpm.

Figure 20B:
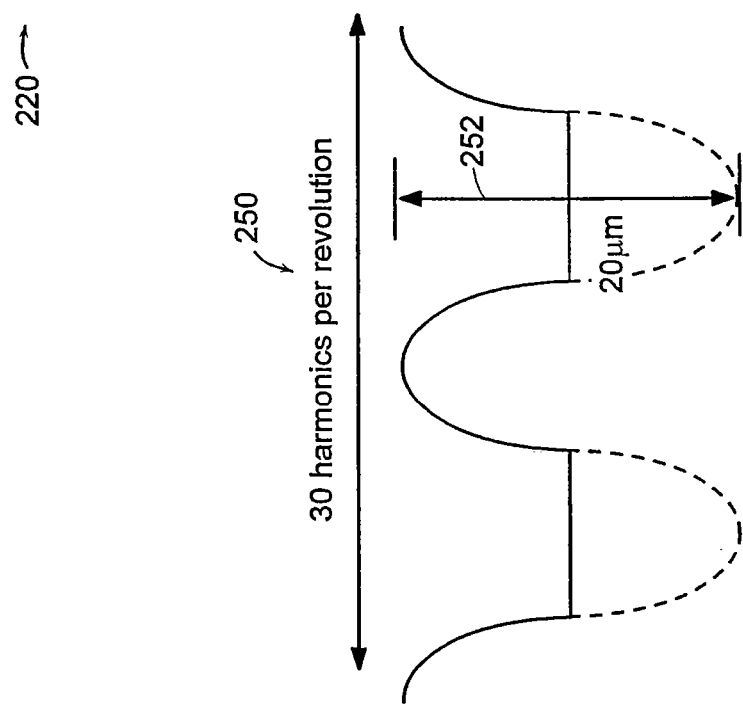
FIG. 20B graphically illustrates a profile, expanded in the circumference, to show a half sinusoidal wave of the diamond turned part illustrated in FIG. 20A wherein the peak-to-valley amplitude of the sine wave is 20 μm in accordance with a preferred embodiment of the present invention.

FIG. 20B illustrates the profile, expanded in the circumference to be a half sinusoidal wave. There are 30 harmonics per spindle revolution and the peak-to-valley amplitude of the sine wave is 20 μm. The flat surface (a piece of aluminum material) was machined first and then the sinusoidal surface was cut.

Figure 20C:
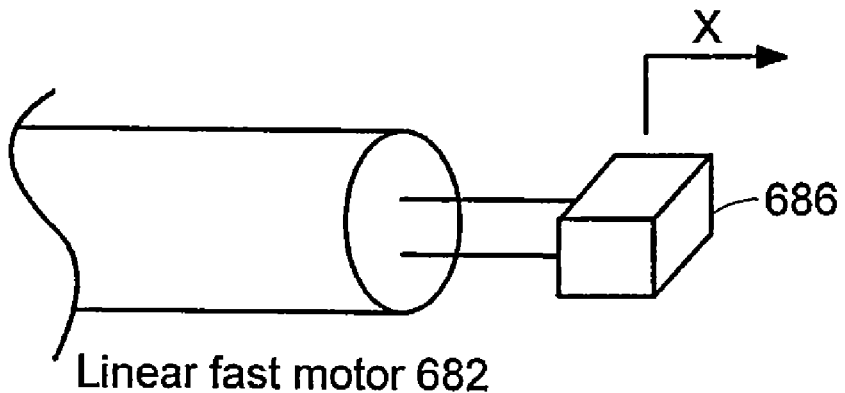
FIGS. 20C-20H illustrate preferred embodiments of positioning systems in accordance with the invention.
Figure 20D:
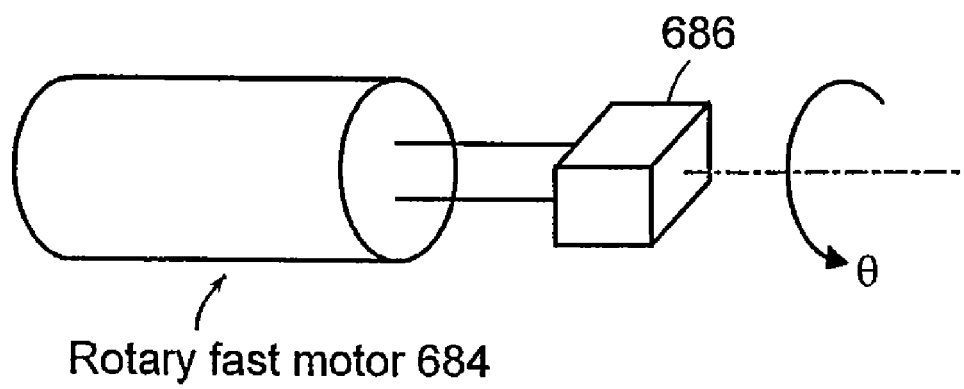

FIGS. 20C and 20D illustrate micro-positioning systems 680. A linear fast motor 682 as described herein is used to position article 686 along a longitudinal (X) axis. Alternatively, a rotary fast motor 684 is used to rotate article 686 around axis through angle 0.

Figure 20E:
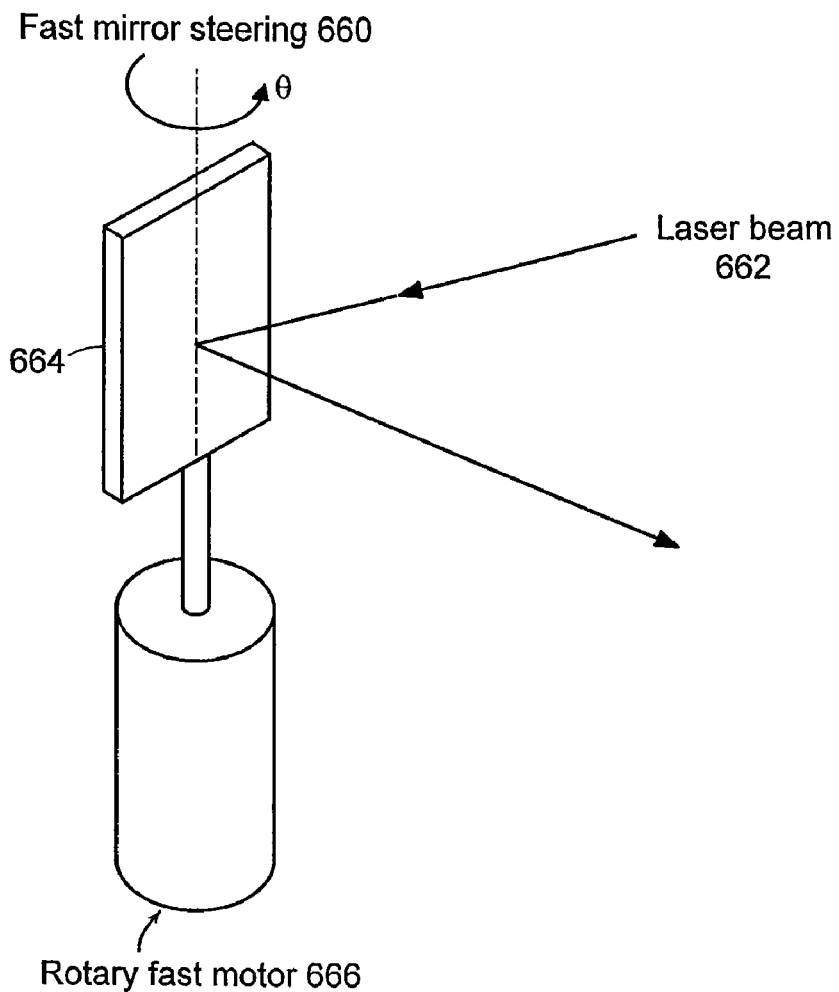
Figure 20F:
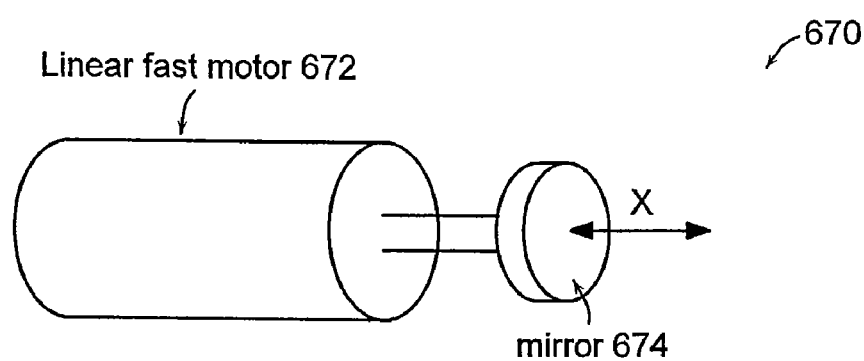

As shown in FIGS. 20E and 20F, fast mirror steering 660 can be obtained using a rotary fast motor 666 as described herein to position mirror 664 to reflect light from a lamp or laser 662 along a path. Alternatively, a linear fast motor 672 can position mirror 674 along an axis.

Figure 20G:
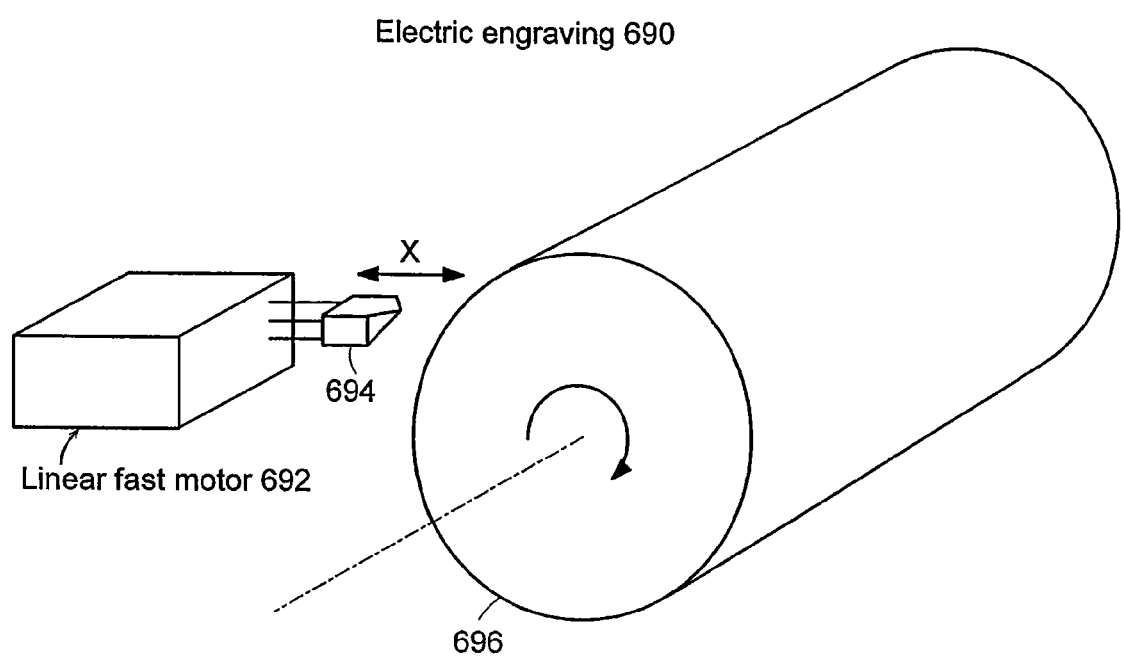
Figure 20H:
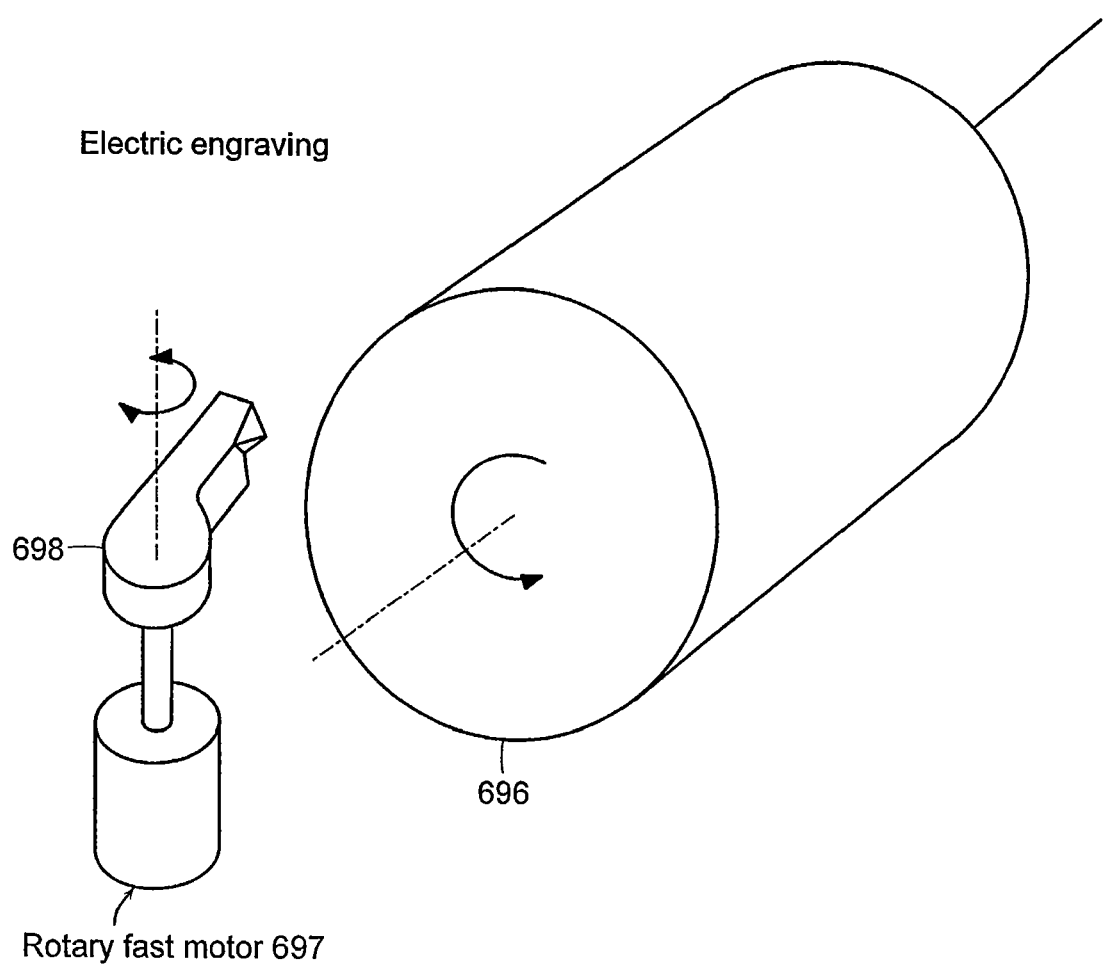

As shown in FIGS. 20G and 20H, an engraver 690 can include a rotating drum 696 positioned relative to a linear motor 692 and tool 694 or rotary motor 697 and tool 698.

It should be noted that, while the actuators described herein control one degree of freedom, the actuators may be used in an array so as to provide more than one degree of freedom. Specifically, there are up to six degrees of freedom that are possible, namely: positive and negative X-axis direction; positive and negative Y-axis direction; positive and negative Z-axis direction; rotation about the X-axis (theta X); rotation about the Y-axis (theta Y); and rotation about the Z-axis (theta Z.)

The following provides for an alternative embodiment of the invention where four magnetic actuators are used together to steer a mirror by allowing the mirror to tip and tilt. The actuator array provides for tipping and tilting of the mirror due to the array having two degrees of freedom. The following is a detailed description of the actuator array, also referred to as a steering mirror system herein, in accordance with an exemplary embodiment of the invention. It should be noted that the number of actuators in an actuator array may differ from the four described herein. Alternatively, there may be more or fewer actuators in the actuator array. In addition, there may be additional or fewer degrees of freedom.

Figure 21:
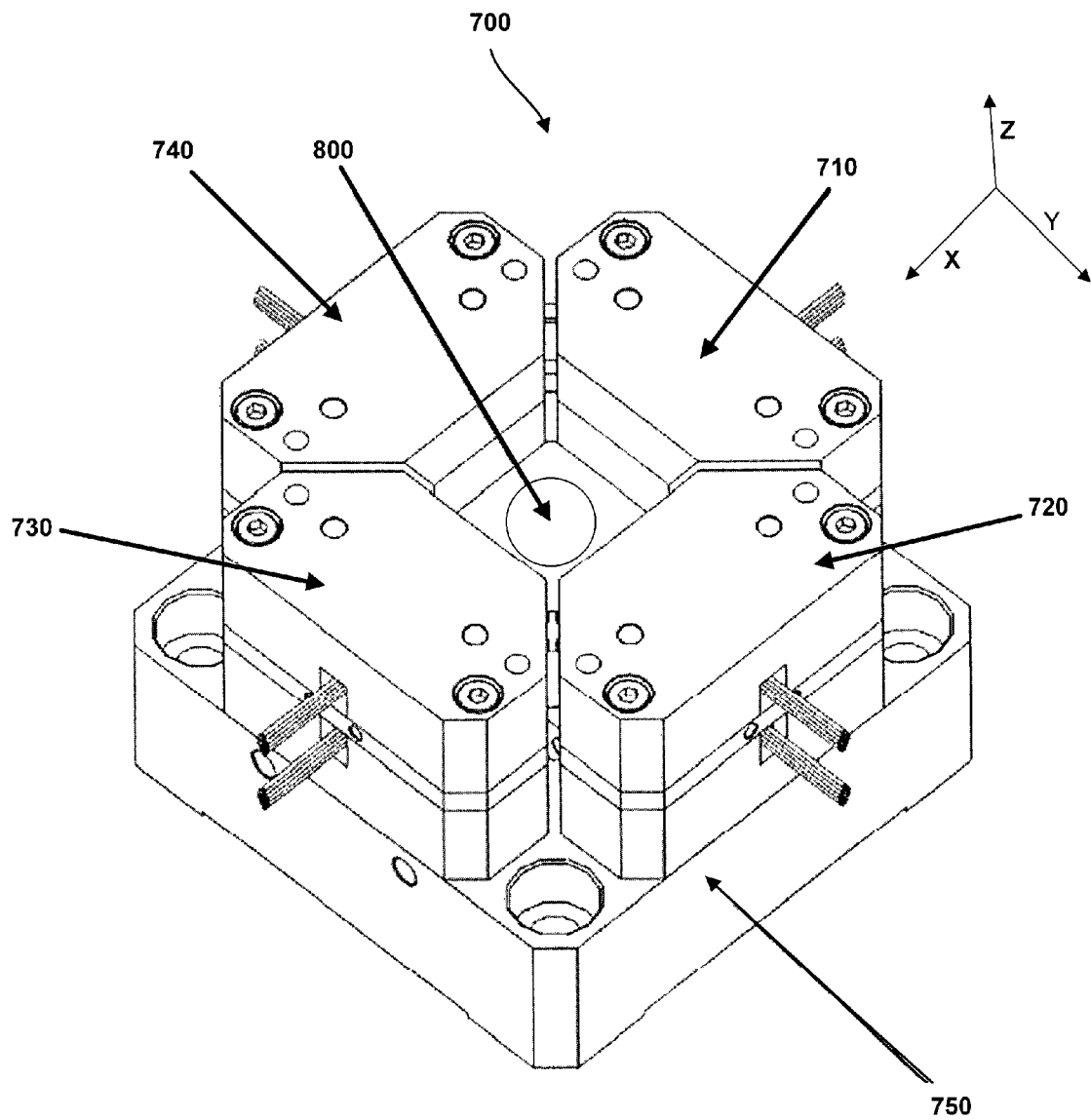
FIG. 21 is a schematic diagram illustrating a variable reluctance fast positioning system in accordance with an exemplary embodiment of the invention.

FIG. 21 is a schematic diagram illustrating a variable reluctance fast positioning system 700 in accordance with the present exemplary embodiment of the invention, where the system 700 contains an array of four (4) actuators 710, 720, 730, 740 and where each actuator 710, 720, 730, 740 is capable of being independently controlled. The positioning system is also referred to as a steering mirror system herein.

Independent control of each actuator 710, 720, 730, 740 is described in detail hereinafter. As is shown by FIG. 21, the system 700 also contains a mirror 800 positioned central to the actuators 710, 720, 730, 740, the position of which is capable of being controlled by the actuators 710, 720, 730, 740. Control of the mirror 800 is provided by controlling the array of actuators 710, 720, 730, 740, as is explained in detail hereinbelow. Control of the actuators 710, 720, 730, 740, as described hereinafter allows the mirror 800 to tip and tilt, thereby providing motion in a theta X and theta Y direction, which is two degrees of freedom.

The system 700 also contains a base 750, to which the actuators 710, 720, 730, 740 are connected. The base 750 may also be connected to a separate structure for the fixation of the system 700 during use.

Figure 22:
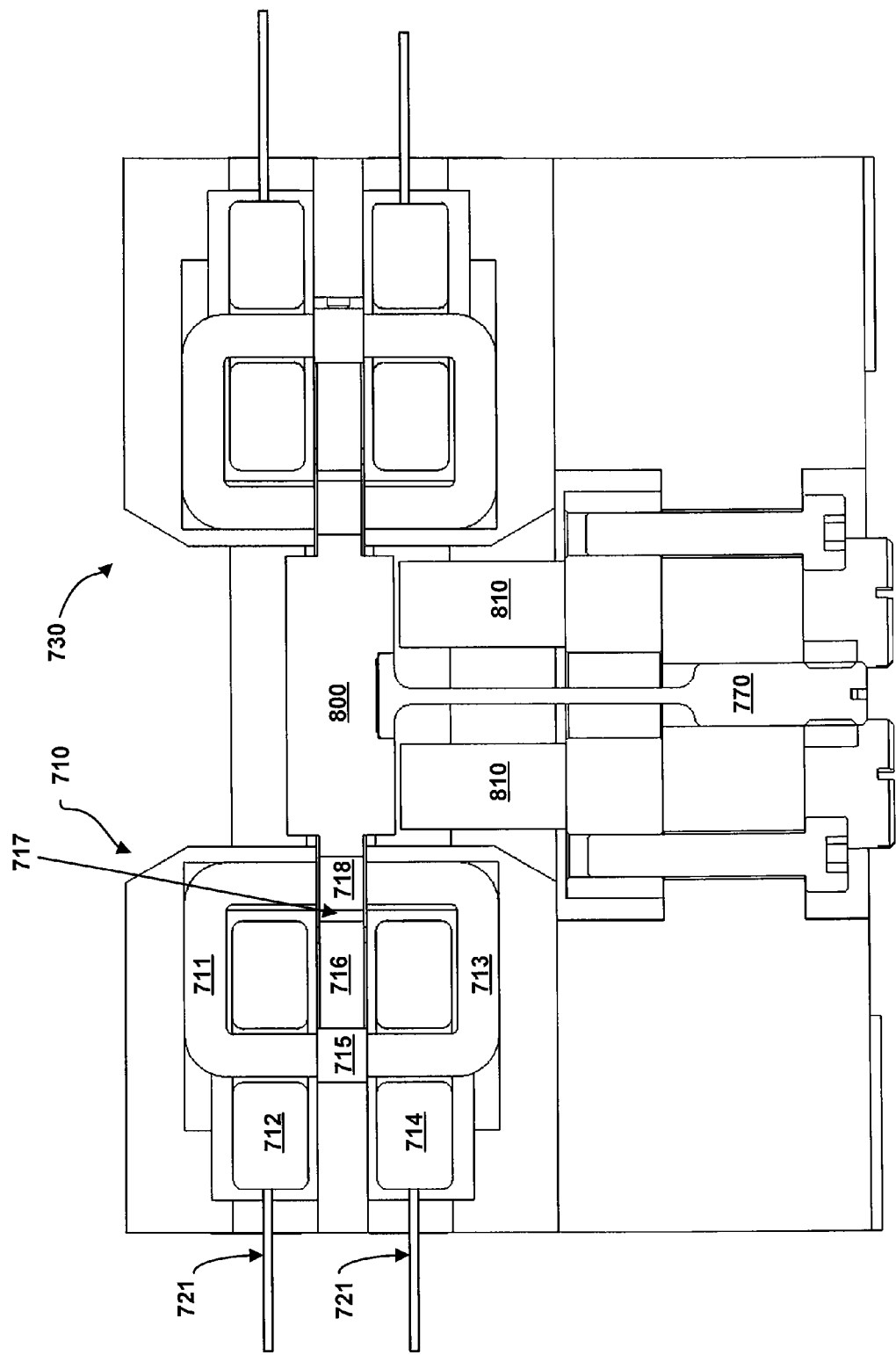
FIG. 22 is a side cross-sectional view of the system of FIG. 21, where the cross-section of two of the actuators is illustrated.

FIG. 22 is a side cross-sectional view of the system of FIG. 21, where the cross-section of two of the actuators is illustrated. For exemplary purposes, the left side actuator is a first actuator 710 and the right side actuator is a third actuator 730. Since both the first and second actuators 710, 730 function in a similar fashion and have the same components, the following describes the first actuator 710.

As is shown by FIG. 22, the first actuator 710 contains a front core 711 and a front winding set 712, where the front winding set 712 is surrounding a left portion of the front core 711. In addition, the first actuator 710 contains a rear core 713, and a rear winding set 714. Each of the winding sets has a conductive wire 721 connected thereto for providing an electrical current, where providing current to the conductive wires 721 of each front winding set and rear winding set pair is independently controlled, thereby allowing for independent control of each actuator. Specifically, as is further mentioned hereinbelow, a front winding set and a rear winding set within the same actuator receive the same electrical current. In addition, the front core 711 and the rear core 713 are fabricated from a magnetically permeable material, which conducts and carries magnetic fields.

As is shown by FIG. 22, a portion of the front winding set 712 is located beneath a central portion of the front core 711 and a portion of the rear winding set 714 is located beneath a central portion of the rear core 713. A middle core 715 is located between the left portion of the front core 711 and the left portion of the rear core 713. In one embodiment, the middle core 715 could be bonded to the front core 711 and the rear core 713, although bonding is not required. It should be noted that the front core 711, the middle core 715, and the rear core 713 may instead be replaced by a single magnetically conductive core.

A permanent magnet 716, a radial bearing 717, and an armature 718 are also located between the front core 711 and the rear core 713. The permanent magnet 716 is located between a central portion of the front core 711 and a central portion of the rear core 713, between the abovementioned portion of the front winding set 712 and the abovementioned portion of the rear winding set 714. A first end of the radial bearing 717 is connected to the permanent magnet 716, while a second end of the radial bearing 717 is connected to a first end of the armature 718.

In accordance with the present invention, the armature 718 is magnetic, while the mirror 800 is not magnetic. As mentioned above, the first end of the armature 718 is connected to the second end of the radial bearing 717. In addition, a second end of the armature 718 is connected to the mirror 800. The armature 718 and the mirror 800 move together and are considered a single moving portion. The radial bearing 717 is provided to constrain unwanted degrees of freedom of the mirror 800 in the Y-axis. Specifically, the radial bearing 717 prevents movement of the armature 718 in a positive and negative Y-axis direction. Therefore, the radial bearing 717 provides both kinematic constraint by eliminating unwanted degrees of freedom, and damping for the steering mirror 800 by minimizing oscillation of the steering mirror 800. It should be noted that the radial bearing 717 may be fabricated from material such as, but not limited to, Neoprene.

As is shown by FIG. 22 a top working air gap 760 is located between a top portion of the armature 718 and a bottom portion of the front core 711. In addition, a bottom working air gap 762 is located between a bottom portion of the armature 718 and a top portion of the rear core 713. Due to connection of the armature 718 to the mirror 800, movement of the armature 718, as is further explained below, results in movement of the mirror 800. Connection between the armature 718 of the first actuator 710, and armatures of the second, third, and fourth actuators 720, 730, 740, and the mirror 800 provides for the capability of controlling movement of the mirror 800, as is explained in detail hereinbelow.

Figure 23:
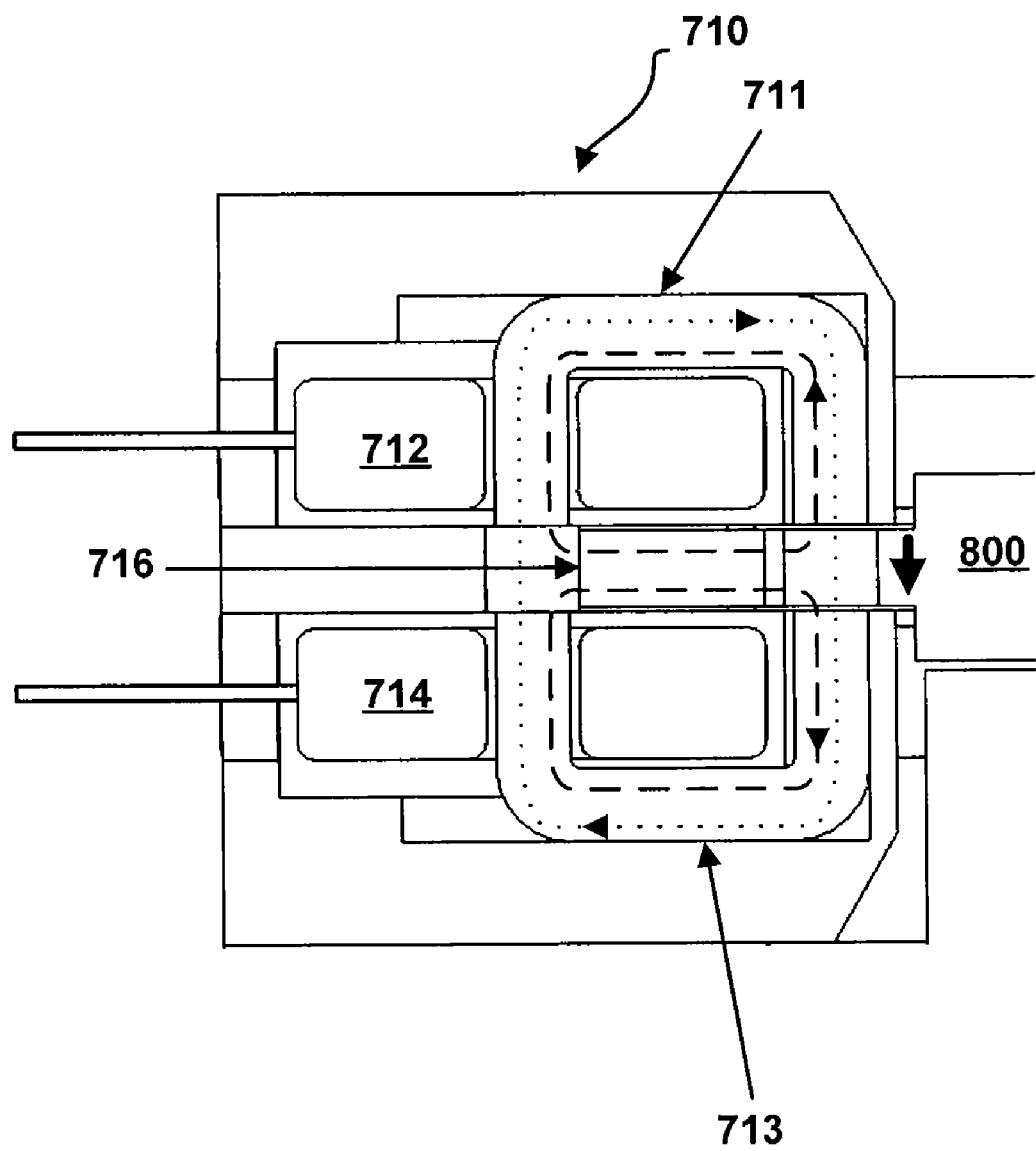
FIG. 23 is a schematic diagram further illustrating the first actuator and flux paths therein.

FIG. 23 is a schematic diagram further illustrating the first actuator 710 and flux paths therein. As is shown by FIG. 23, the permanent magnet 716 generates a permanent magnet flux that travels in two directions of equal magnitude, shown as a hashed arrow line. The resulting forces generated in the upper and lower air gaps, respectively, are of equal magnitude but opposite direction, and therefore cancel. Energizing of a winding set 712, 714 results in a coil flux that travels along the path represented by the dotted arrow line. The result of superposing the coil flux with the permanent magnet flux is movement of the steering mirror 800 in the direction where both the coil flux and permanent magnet flux are in the same direction. By changing the current through the winding sets 712, 714, the steering mirror 800 is displaced. FIG. 23 provides an example where the steering mirror 800 is displaced downward.

To provide for tipping or tilting of the steering mirror 800, the winding set in a first actuator is energized in positive polarity while the winding set in a second actuator that is located opposite the first actuator, is energized in negative polarity. This applies a moment to the mirror resulting in an angular acceleration.

Referring back to FIG. 21, the system 700 also contains an axial flexure 770 for constraining movement of the steering mirror 800 and the armature 718 in the Z-axis, also referred to herein as the Z degree of freedom (i.e., up and down). In accordance with the present invention the axial flexure 770 provides strong support to prevent the mirror 800 from moving up and down in the Z-axis. In addition, since the axial flexure 770 is thin, the axial flexure 770 provides minimal support of the steering mirror 800 and the armature 718 in the theta x and theta y directions, thereby allowing tip and tilt of the steering mirror 800.

A series of position sensors 810 are located beneath the steering mirror 800 for purposes of measuring displacement of the bottom of the steering mirror 800. As an example, in accordance with the preferred embodiment of the invention, there is one linear position sensor 810 located beneath each corner of the steering mirror 800. A space is provided between a top portion of each position sensor 810 and a bottom portion of the steering mirror 800. Preferably, the position sensors 810 are capacitive position sensors capable of determining a distance between a top portion of each position sensor 810 and a bottom portion of the steering mirror 800. The linear position sensors provide linear measurements that may be converted to angle measurements of the steering mirror 800 by using methods known to those having ordinary skill in the art.

While the position sensor 810 used in accordance with the preferred embodiment of the invention is a capacitance position sensor, one having ordinary skill in the art would appreciate that other position sensors may instead be used. As an example, two angle sensors may instead be used. In addition, additional or fewer position sensors 810 may be provided within the present system 700. As an example, a single position sensor could be provided, where the position sensor is located central to the steering mirror 800. In addition, the position sensor may be, for example, an inductive sensor, an optical sensor, or a glass scale sensor.

In accordance with an alternative embodiment of the invention, the system of FIG. 21 may be modified so as to provide three (3) degrees of freedom. Specifically, the axial flexure 770 of FIG. 21 may be removed, thereby allowing movement of the mirror 800 in the positive and negative Z-axis. With the axial flexure 770 removed, movement of the mirror 800 in the positive and negative Z-axis is allowed. By controlling the four actuators to work in unison (i.e., both up or both down), motion of the mirror 800 in the Z-axis may be controlled.

Figure 24:
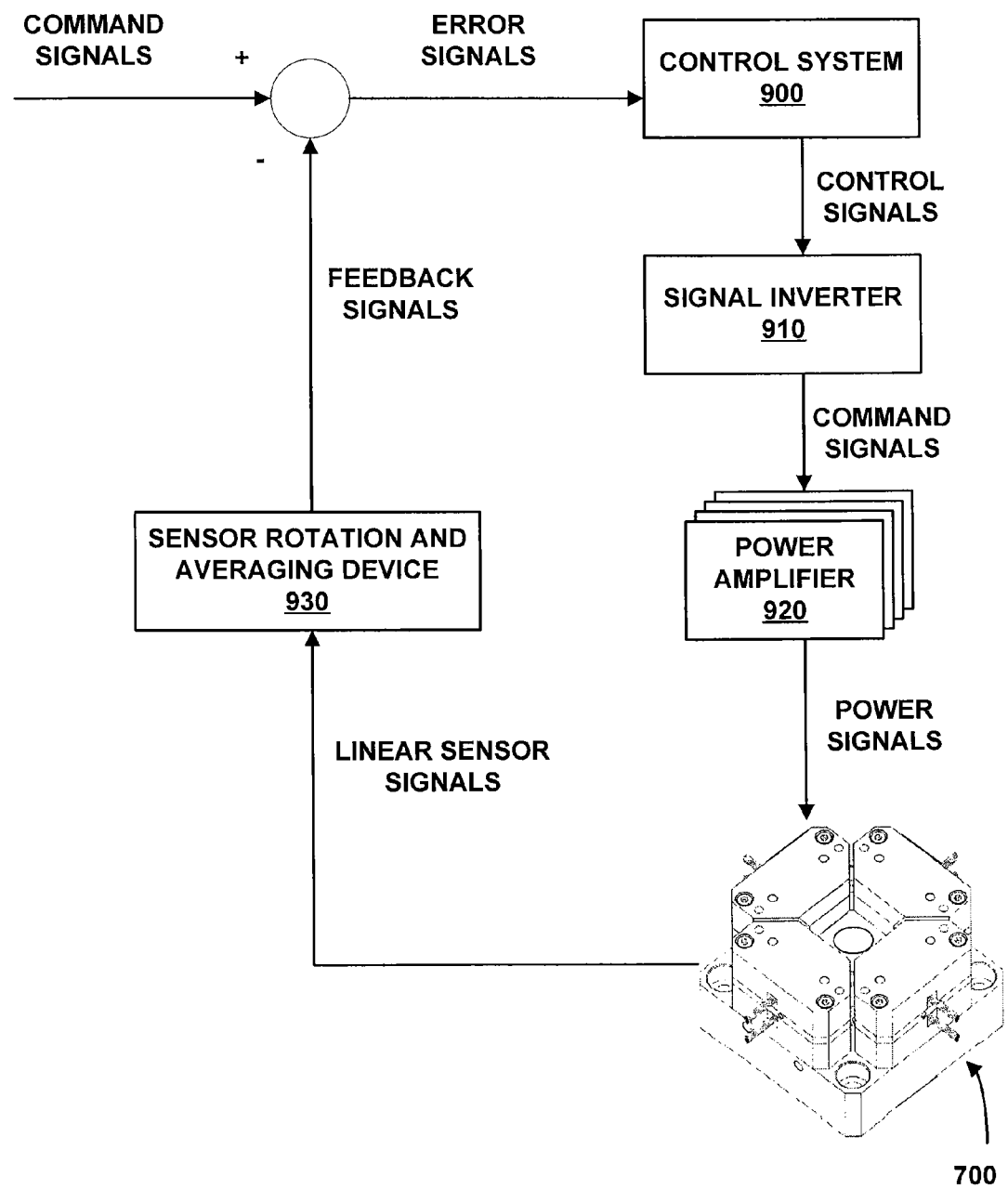
FIG. 24 is a schematic diagram illustrating a control environment in which the system of FIG. 21 may be used.

FIG. 24 is a schematic diagram illustrating a control environment in which the system 700 of FIG. 21 may be used and associated signal processing. As is shown by FIG. 24, command signals are received which provide a desired angle of the steering mirror 800. The desired angle of the steering mirror 800 is received at a summing junction, which compares an actual angle of the steering mirror 800 to the desired angle of the steering mirror 800. Error signals are derived representing a difference between the actual angle of the steering mirror 800 to the desired angle of the steering mirror 800.

The error signals are received by a real-time control system 900, which is capable of deriving control signals for controlling of the actuators 710, 720, 730, 740 in accordance with the desired angle of the steering mirror 800 (i.e., the error signals). A control signal is provided by the control system 900 to control tilt of the steering mirror 800 and a control signal is provided by the control system 900 to control tip of the steering mirror 800. It should be known that the control system 900 may contain for example, a dynamic nonlinear compensator, an adaptive-feed forward compensator, and a frequency shaping compensator. In addition, the control system may contain at least one digital signal processor and a graphical user interface. One having ordinary skill in the art would appreciate that other known controllers may be used.

The control signals are received by a signal inverter 910 that generates equal and opposite control signals that will be provided to oppositely located actuators. Each one of the control signals is sent to a separate power amplifier 920. The control signals are received by the power amplifier 920, which amplifies the control signals for forwarding to actuators 710, 720, 730, 740. In accordance with this exemplary embodiment of the invention, each control signal is forwarded to a separate actuator 710, 720, 730, 740, where the equal and opposite of a control signal sent to a first actuator is sent to an oppositely located second actuator. The control signals are received by winding sets, thereby controlling movement of the steering mirror 800. To elaborate, in providing for tipping or tilting of the steering mirror 800, the winding set in a first actuator is energized in positive polarity while the winding set in a second actuator that is located opposite the first actuator, is energized in negative polarity. This applies a moment to the mirror resulting in an angular acceleration.

The power amplified control signals are transmitted to the system 700 for control of the steering mirror 800. Linear sensing signals associated with actual steering mirror location are received by a sensor rotation and averaging device 930. In addition, the device 930 provides an angular measurement in a single degree of freedom by computing the angle result for each of the four linear sensors and averaging to produce a high fidelity composite measurement. The result is feedback signals that are returned to the summing junction for comparison to the desired angle is determining the error signals. One having ordinary skill in the are would understand the signal processing provided by FIG. 24 and understand that other signal processing methods may be provided.

In accordance with the present invention, the number of position sensors 810 exceeds the number of actuated degrees of freedom. In the present example, four position sensors are used to sense two degrees of freedom. As such, the device performance may be improved by applying averaging techniques to the set of sensor signals. An angular measurement in a single degree of freedom is obtained by computing the angle result for each of the four linear sensors and averaging to produce a high fidelity composite measurement. In particular, errors in sensor positioning and alignment, as well as undesirable mirror structural mode excitations at one more of the sensor locations, are reduced or eliminated by the averaging technique.

The actual angle of the steering mirror 800, as determined by the position sensors 810, is transmitted to the control system 900 for comparison to the requested angle of the steering mirror 800. The control system 900 is capable of receiving the actual movement information and creating corrective steering mirror 800 movement information in accordance with the desired movement. The corrective information is used to create new control signals that will be transmitted to the actuators 710, 720, 730, 740. Creating of the corrective information is performed using closed loop control theory, which is known by those having ordinary skill in the art.

It should be noted that elements of the system 700 may be fabricated using known micro-electro-mechanical (MEMS) fabrication techniques or other techniques. The above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed:

1. A device for positioning an article, said device comprising:
    a frame;
    a series of actuators connected to said frame, wherein said series of actuators contains at least one armature therein, wherein said at least one armature is connected to said article, said series of actuators providing a force on said at least one armature to actuate movement of said at least one armature, thereby causing movement of said article, and wherein each actuator further comprises:
        at least one winding set for providing a coil flux;
        at least one permanent magnet for providing a permanent magnet flux; and
        a magnetically conductive core having said permanent magnet therein and at least a portion of said at least one winding set therein,
    wherein said series of actuators provides said at least one armature and said article with more than one degree of freedom due to the combination of said coil flux and said permanent magnet flux, and wherein said series of actuators is driven in opposition to cause a moment and thereby rotation of the article.

2. The device of claim 1, further comprising a flexure preventing said article from moving along an axis.

3. The device of claim 1, wherein said article is a mirror.

4. The device of claim 1, further comprising a position sensor for determining a position of said article.

5. The device of claim 4, wherein said position sensor is a series of linear capacitive position sensors.

6. The device of claim 4, wherein said position sensor is at least one angle sensor.

7. The device of claim 4, wherein said position determined by said position sensor is used to effect said coil flux.

8. The device of claim 1, wherein a radial bearing is located between said permanent magnet and said armature, said radial bearing preventing unwanted degrees of freedom of said article.

9. The device of claim 1, wherein said winding set is driven by a linear power amplifier.

10. The device of claim 1, wherein said magnetically conductive core comprises a front core and a rear core.

11. The device of claim 4, further comprising a controller for receiving actual position information of said article and creating corrective article position information in accordance with a desired position of said article.

12. The device of claim 11, wherein said corrective article position information is used to effect said coil flux.

13. The device of claim 11, wherein said controller comprises at least one of a dynamic nonlinear compensator, an adaptive-feed forward compensator, and a frequency shaping compensator.

14. The device of claim 13, wherein said controller comprises at least one digital signal processor.

15. The device of claim 4, wherein said position sensor is selected from the group consisting of a capacitance sensor, an inductive sensor, an optical sensor, and a glass scale.

16. A device for positioning an article, said device comprising:
    a frame;
    a series of actuators connected to said frame, wherein said series of actuators contains at least one armature therein, wherein said at least one armature is connected to said article, said series of actuators providing a force on said at least one armature to actuate movement of said at least one armature, thereby causing movement of said article, and wherein each actuator further comprises:
        at least one winding set for providing a coil flux;
        at least one permanent magnet for providing a permanent magnet flux; and
        a magnetically conductive core having said permanent magnet therein and at least a portion of said at least one winding set therein,
    wherein said series of actuators provides said at least one armature and said article with more than one degree of freedom due to the combination of said coil flux and said permanent magnet flux, and wherein said series of actuators further comprises four actuators, wherein a first actuator is positioned opposite a third actuator and a second actuator is positioned opposite a fourth actuator.

17. The device of claim 16, wherein each of said actuators further comprises a first winding set and a second winding set, said permanent magnet being located between at least a portion of said first winding set and at least a portion of said second winding set.

18. The device of claim 16, wherein said first actuator and said third actuator determine rotation of said article about an X-axis, and wherein said second actuator and said fourth actuator determine rotation of said article about a Y-axis.

19. The device of claim 16, wherein each actuator further comprising a top working air gap located between a top portion of an armature and said magnetically conductive core, and a bottom working air gap located between a bottom portion of said armature and said magnetically conductive core.

20. The device of claim 16, wherein a winding set in said first actuator is energized in positive polarity while a winding set in said third actuator that is located opposite said first actuator, is energized in negative polarity.

21. The device of claim 1, wherein said device is located within a system comprising:
    a control system capable of deriving control signals for controlling said actuators in accordance with a desired angle of said article;
    a signal inverter capable of generating equal and opposite control signals; and
    at least one power amplifier for amplifying control signals for forwarding to said actuators within said device.

* * * * *